(12) United States Patent
Kim et al.

(10) Patent No.: US 9,142,997 B2
(45) Date of Patent: Sep. 22, 2015

(54) WIRELESS POWER TRANSMISSION SYSTEM, AND METHOD AND APPARATUS FOR ALLOCATING COMMUNICATION CHANNEL AND TRANSMITTING POWER IN WIRELESS POWER TRANSMISSION SYSTEM

(75) Inventors: Nam Yun Kim, Seoul (KR); Sang Wook Kwon, Seongnam-si (KR); Yun Kwon Park, Dongducheon-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 13/486,449

(22) Filed: Jun. 1, 2012

(65) Prior Publication Data

US 2012/0309308 A1 Dec. 6, 2012

Related U.S. Application Data

(60) Provisional application No. 61/491,953, filed on Jun. 1, 2011.

(30) Foreign Application Priority Data

Aug. 5, 2011 (KR) .......................... 10-2011-0078104

(51) Int. Cl.
*H04B 5/00* (2006.01)
*H02J 7/02* (2006.01)
(Continued)

(52) U.S. Cl.
CPC ............... *H02J 7/025* (2013.01); *B60L 11/182* (2013.01); *B60L 11/1833* (2013.01); *H02J 5/005* (2013.01);
(Continued)

(58) Field of Classification Search
CPC .. H04B 5/0031; H04B 5/0037; H04B 5/0093; H04B 5/0081; B60L 11/182; B60L 11/1833; B60L 2210/10; B60L 2210/30; B60L 2210/40; B60L 2250/16; H02J 17/00; H02J 5/005; H02J 7/025; Y02T 10/7005; Y02T 10/7241; Y02T 90/12; Y02T 90/121; Y02T 90/122; Y02T 90/125; Y02T 90/127; Y02T 90/14; Y02T 90/16

See application file for complete search history.

(56) References Cited

U.S. PATENT DOCUMENTS 6,954,615 B2 * 10/2005 Sano ............................ 455/41.1
8,180,295 B2 * 5/2012 Mao ............................. 455/41.3
(Continued)

FOREIGN PATENT DOCUMENTS

EP 2328253 A2 6/2011
JP 2003-87867 A 3/2003
(Continued)

OTHER PUBLICATIONS

U.S. Appl. No. 13/484,654, filed May 31, 2012, Nam Yun Kim et al., Samsung Electronics Co., Ltd.
(Continued)

*Primary Examiner* — Lewis West
(74) *Attorney, Agent, or Firm* — NSIP Law

(57) ABSTRACT

A wireless power transmission system, and a method and an apparatus for allocating a communication channel and transmitting a power in the wireless power transmission system. If a target device configured to wirelessly receive power from a source device is detected, a controlling communication channel to be used for performing communication with the target device is selected. An initial control signal including an identifier (ID) of the source device and a channel fix command are transmitted to the target device through the selected controlling communication channel. The channel fix command includes a command requesting the target device to use the selected controlling communication channel. A charging power is transmitted from the source device to the target device through a magnetic coupling between the source device and the target device.

16 Claims, 20 Drawing Sheets

(51) Int. Cl.
*B60L 11/18* (2006.01)
*H02J 5/00* (2006.01)

(52) U.S. Cl.
CPC ............ *H04B 5/0031* (2013.01); *H04B 5/0037* (2013.01); *H04B 5/0081* (2013.01); *H04B 5/0093* (2013.01); *B60L 2210/10* (2013.01); *B60L 2210/30* (2013.01); *B60L 2210/40* (2013.01); *B60L 2250/16* (2013.01); *Y02T 10/7005* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 8,355,748 | B2 * | 1/2013 | Abe et al. | ................... 455/552.1 |
| 2002/0181417 | A1 | 12/2002 | Malhotra et al. | |
| 2003/0087645 | A1 | 5/2003 | Kim et al. | |
| 2008/0171520 | A1 * | 7/2008 | Steer | ............................... 455/77 |
| 2011/0043163 | A1 | 2/2011 | Baarman | |
| 2011/0266882 | A1 * | 11/2011 | Yamamoto et al. | ........... 307/104 |
| 2012/0306286 | A1 * | 12/2012 | Kim et al. | ..................... 307/104 |

FOREIGN PATENT DOCUMENTS

| KR | 10-2002-0086987 A | 11/2002 |
|---|---|---|
| KR | 10-2003-0026817 A | 4/2003 |
| KR | 10-2004-0028072 A | 4/2004 |
| KR | 10-2005-0024744 A | 3/2005 |
| KR | 10-2010-0011141 A | 2/2010 |

OTHER PUBLICATIONS

U.S. Appl. No. 13/485,053, filed May 31, 2012, Nam Yun Kim et al., Samsung Electronics Co., Ltd.

Extended European Search Report issued on Apr. 24, 2015 in counterpart European Application No. 12822882.2 (7 pages, in English).

* cited by examiner

→ INPUT CURRENT
---→ INDUCED CURRENT

WIRELESS POWER TRANSMISSION SYSTEM, AND METHOD AND APPARATUS FOR ALLOCATING COMMUNICATION CHANNEL AND TRANSMITTING POWER IN WIRELESS POWER TRANSMISSION SYSTEM

CROSS-REFERENCE TO RELATED APPLICATIONS

This application claims the benefit under 35 USC 119(e) of U.S. Provisional Application No. 61/491,953 filed on Jun. 1, 2011, and the benefit under 35 USC 119(a) of Korean Patent Application No. 10-2011-0078104 filed on Aug. 5, 2011, in the Korean Intellectual Property Office, the disclosures of which are incorporated herein by reference in their entirety for all purposes.

BACKGROUND

1. Field

The following description relates to a wireless power transmission system, and a method and an apparatus for allocating a communication channel in the wireless power transmission system.

2. Description of Related Art

Wireless power is energy that is transferred from a wireless power transmitting unit to a wireless power receiving unit using magnetic coupling. Accordingly, a wireless power transmission system includes a source device to wirelessly transmit a power, and a target device to wirelessly receive the power. The source device may be referred to as a wireless power transmitting unit, and the target device may be referred to as a wireless power receiving unit.

The source device includes a source resonator, and the target device includes a target resonator. A magnetic coupling or a resonant coupling may be formed between the source resonator and the target resonator.

The source device and the target device may transmit and receive data to and from each other using an out-band communication scheme or an in-band communication scheme. The communication between the source device and the target device may cause interference in other electronic devices, or may be affected by the other electronic devices.

SUMMARY

According to an aspect, a method of allocating a communication channel and transmitting a power in a wireless power transmission system includes selecting a controlling communication channel to be used for performing communication with a target device configured to wirelessly receive a power from a source device when the target device is detected; transmitting, to the target device, an initial control signal including an identifier (ID) of the source device and a channel fix command through the selected controlling communication channel; receiving, from the target device, a signal in response to the channel fix command; allocating a controlling ID to the target device; and entering a charging mode in which a charging power to be used for charging is transmitted from the source device to the target device; wherein the channel fix command includes a command requesting the target device to use the selected controlling communication channel; and the charging power is transmitted from the source device to the target device through a magnetic coupling between the source device and the target device.

The selecting of a controlling communication channel may further include transmitting, to the target device, a wake-up power that is used to activate a communication function and a control function of the target device; searching for an available controlling communication channel based on detection of a carrier signal; and selecting a controlling communication channel to be used for performing communication with the target device based on a result of the searching for the available controlling communication channel.

The searching for an available controlling communication channel may include selecting a first communication channel from N communication channels, N being an integer greater than or equal to 2; determining whether a carrier signal is detected through the first communication channel; determining whether a level of the detected carrier signal is greater than a predetermined value if a carrier signal is detected through the first communication channel; selecting a second communication channel from the N communication channels if the level of the carrier signal detected through the first communication channel is greater than or equal to the predetermined value; and determining whether a carrier signal is detected through the second communication channel.

The selecting of a controlling communication channel may further include selecting the first communication channel as the controlling communication channel if a carrier signal is not detected through the first communication channel, or if the level of the carrier signal detected through the first communication channel is less than the predetermined value.

The transmitting of an initial control signal may include transmitting, to the target device, the initial control signal during consecutive time periods based on an amount of time used by the target device for scanning the N communication channels.

The method may further include determining whether a communication error has occurred in the charging mode; searching for an empty channel among N communication channels if a communication error has occurred, N being an integer greater than or equal to 2; transmitting, to the target device, a channel change command through the selected controlling communication channel if an empty channel is found; and changing the controlling communication channel to the found empty channel if a response to the channel change command is received is received from the target device.

The method may further include allocating a controlling ID to a new target device detected in the charging mode; adjusting a level of the charging power based on a device load of the new target device; detecting a reflected wave of the charging power; and releasing a connection of the new target device if a signal level of the reflected wave is greater than a predetermined value.

The method may further include receiving, from the target device, information about a receiving sensitivity of the initial control signal and/or information about a receiving level of the charging power; and determining whether the target device is located within a power transmission area of the source device based on the information about the receiving sensitivity of the initial control signal and/or the information about the receiving level of the charging power.

According to an aspect, a method of allocating a communication channel and transmitting a power in a wireless power transmission system includes receiving, in a target device, a wake-up power that is used to activate a communication and control function of the target device from a source device; activating a communication module of the target device using the received wake-up power; selecting a first communication channel from N communication channels, N being an integer greater than or equal to 2; determining whether the first communication channel is in use; determining whether an initial control signal including a channel fix command is received from the source device if the first communication channel is in use; transmitting, to the source device, a signal in response to the channel fix command if the initial control signal is received from the source device; and receiving, from the source device, a charging power to be used for charging the target device; wherein the charging power is transmitted from the source device to the target device through a magnetic coupling between the source device and the target device.

The method may further include selecting a second communication channel from the N communication channels if the first communication channel is not in use; and determining whether the second communication channel is in use.

The determining of whether the first communication channel is in use may include determining whether a carrier signal is detected through the first communication channel; and determining whether the first communication channel is in use based on whether a carrier signal is detected through the first communication channel.

The method may further include transmitting, to the source device, information about a receiving sensitivity of the initial control signal and/or information about a receiving level of the charging power; and receiving a controlling ID allocated by the source device to the target device based on the information about the receiving sensitivity of the initial control signal and/or the information about the receiving level of the charging power.

According to an aspect, a source device of a wireless power transmission system includes a power converter configured to generate a wake-up power or a charging power by converting a direct current (DC) voltage to an alternating current (AC) voltage using a resonant frequency; a source resonator configured to transmit, to a target device, the generated wake-up power or the generated charging power through a magnetic coupling between the source device and the target device; and a control and communication (control/communication) unit configured to search for an available controlling communication channel based on detection of a carrier signal; select a controlling communication channel to be used for performing communication with the target device based on a result of the searching for the available controlling communication channel; and transmit, to the target device, an initial control signal including an identifier (ID) of the source device and a channel fix command through the selected controlling communication channel.

The control/communication unit is may be further configured to select a first communication channel from N communication channels, N being an integer greater than or equal to 2; determine whether a carrier signal is detected through the first communication channel; determine whether a level of the detected carrier signal is greater than a predetermined value if a carrier signal is detected through the first communication channel; select a second communication channel from the N communication channels if the level of the carrier signal detected through the first communication channel is greater than or equal to the predetermined value; and determine whether a carrier signal is detected through the second communication channel.

According to an aspect, a target device of a wireless power transmission system includes a target resonator configured to receive, from a source device, a wake-up power that is used to activate a communication and control function of the target device, or a charging power to be used for charging the target device, through a magnetic coupling between the source device and the target device; and a control and communication (control/communication) unit configured to be activated by the wake-up power; select a first communication channel from N communication channels, N being an integer greater than or equal to 2; determine whether a carrier signal is detected through the first communication channel; determines whether an initial control signal including a channel fix command is received from the source device if a carrier signal is detected through the first communication channel; and transmit, to the source device, a signal in response to the channel fix command if the initial control signal is received from the source device.

The control/communication unit is may be further configured to second a second communication channel from the N communication channels if a carrier signal is not detected through the first communication channel; and determine whether a carrier signal is detected through the second communication channel.

According to an aspect, a method of allocating a communication channel and transmitting a power in a source device of a wireless power transmission system includes detecting a target device configured to wirelessly receive a power from the source device though a magnetic coupling between the source device and the target device; selecting a controlling communication channel to be used for performing communication with the target device; transmitting a channel fix command requesting the target device to use the controlling communication channel to communicate with the source device to the target device through the controlling communication channel; determining whether an acknowledgement has been received from the target device in response to the channel fix command; if an acknowledgement has been received from the target device in response to the channel fix command, allocating a controlling ID to the target device; and if a controlling ID has been allocated to the target device, initiating a charging mode of the source device and transmitting a charging power to operate the target device or charge an energy storage element of the target device from the source device to the target device through the magnetic coupling between the source device and the target device.

The method may further include, if an acknowledgement has not been received from the target device in response to the channel fix command, determining whether a number of times the channel fix command has been transmitted to the target device is greater than a predetermined number of times; if the number of times the channel fix command has been transmitted to the target device is not greater than the predetermined number of times, transmitting the channel fix command to the target device through the selected controlling communication channel again; and if the number of times the channel fix command has been transmitted to the target device is greater than the predetermined number of times, performing an error process.

The selecting of a controlling communication channel may include searching for a communication channel that is not being used by another source device to transmit a power to another target device among a plurality of communication channels; if a communication channel that is not being used by another source device to transmit a power to another target device is found during the searching, selecting the communication channel that was found as the controlling communication channel; and if a communication channel that is not being used by another source device to transmit a power to another target device is not found during the searching after all of the communication channels have been searched, repeating the searching.

The method may further include determining whether an error in communication between the source device and the target device has occurred while the source device is operating in the charging mode; if an error in communication has not occurred, repeating the determining of whether an error in communication has occurred; if an error in communication has occurred, searching for another communication channel that is not being used by another source device to transmit a power to another target device among a plurality of communication channels; if another communication channel that is not being used by another source device to transmit a power to another target device is found during the searching, changing the controlling communication channel to the other communication channel that is not being used by another source device to transmit a power to another target device; if another communication channel that is not being used by another source device to transmit a power to another target device is not found during the searching after all of the communication channels have been searched, determining whether a number of times all of the communication channels have been searched is greater than a predetermined number of times; if the number of times all of the communication channels have been searched is not greater than the predetermined number of times, repeating the searching; and if the number of times all of the communication channels have been searched is greater than the predetermined number of times, performing an error process.

The changing of the controlling communication channel to the other communication channel that is not being used by another source device to transmit a power to another target device may include transmitting a channel change command requesting the target device to use the other communication channel to communicate with the source device to the target device through the controlling communication channel; determining whether an acknowledgement has been received from the target device in response to the channel change command; if an acknowledgement has been received from the target device in response to the channel change command, changing the controlling communication channel to the other communication channel; if an acknowledgement has not been received from the target device in response to the channel change command, determined whether a predetermined time has elapsed since the channel change command was transmitted to the target device; if the predetermined time has not elapsed, repeating the determining of whether an acknowledgement has been received from the target device in response to the channel change command; and if the predetermined time has elapsed, performing an error process.

The method may further include, after the changing of the controlling communication channel to the other communication channel, transmitting an inquiry as to whether the target device has changed a communication channel for communicating with the source device to the other communication channel to the target device through the controlling communication channel that has been changed to the other communication channel; determining whether an acknowledgement has been received from the target device in response to the inquiry; if an acknowledgement has been received from the target device in response to the inquiry, continuing to operate the source device in the charging mode; and if an acknowledgement has not been received from the target device in response to the inquiry, performing an error process.

Other features and aspects will be apparent from the following detailed description, the drawings, and the claims.

DETAILED DESCRIPTION

Figure 1:
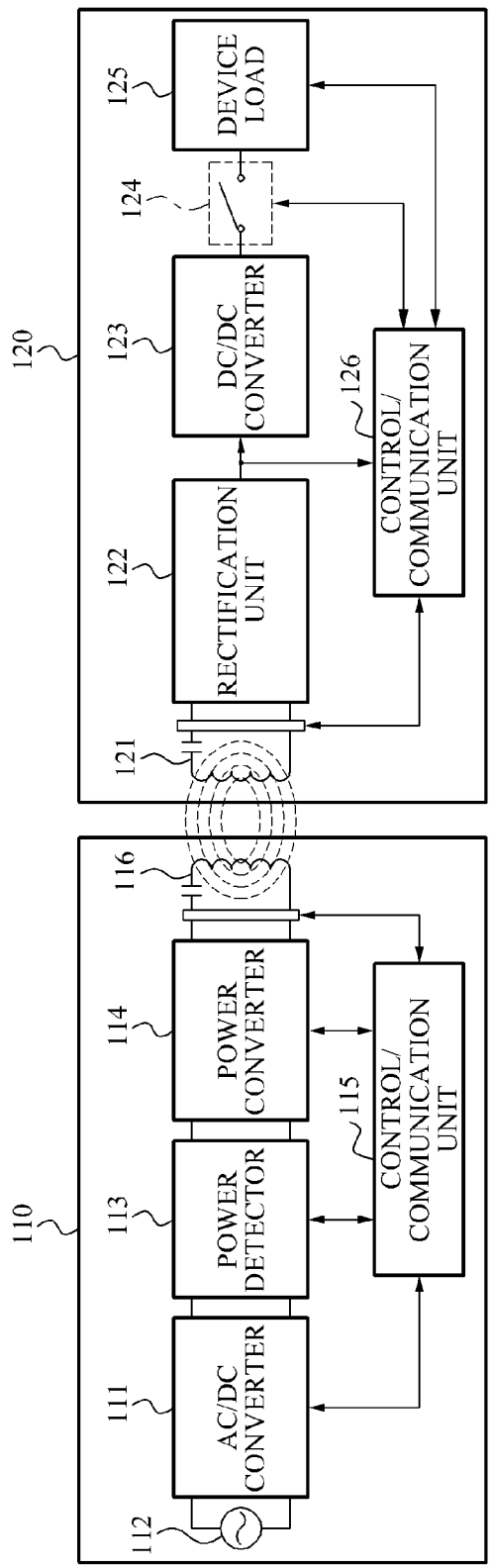
FIG. 1 is a diagram illustrating a wireless power transmission and charging system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of processing steps and/or operations described herein are merely examples, and the sequences of processing steps and/ or operations are not limited to those described herein, but may be changed as will be apparent to one of ordinary skill in the art, with the exception of processing steps and/or operations necessarily occurring in a certain order. Also, descriptions of well-known functions and constructions may be omitted for increased clarity and conciseness.

Throughout the drawings and the detailed description, the same drawing reference numerals refer to the same elements The relative sizes and depictions of these elements may be exaggerated for clarity, illustration, and convenience.

FIG. 1 is a diagram illustrating a wireless power transmission and charging system according to an example. Referring to FIG. 1, the wireless power transmission and charging system includes a source device 110, and a target device 120.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a device load 125, and a control/communication unit 126. The target device 120 may further include a communication module (not shown). The communication module may include a communication circuit, for example, a Bluetooth circuit or a wireless local area network (WLAN) circuit.

The AC/DC converter 111 generates a DC voltage by rectifying an AC voltage having a frequency of tens of hertz (Hz) output from a power supply 112. The AC/DC converter 111 may output a DC voltage having a predetermined level, or may adjust an output level of a DC voltage based on the control of the control/communication unit 115.

The power detector 113 detects an output current and an output voltage of the AC/DC converter 111, and transfers, to the control/communication unit 115, information on the detected current and the detected voltage. Additionally, the power detector 113 detects an input current and an input voltage of the power converter 114.

The power converter 114 generates a wake-up power or a charging power to be used for charging by converting a DC voltage to an AC voltage using a resonant frequency.

The power converter 114 generates a power by converting a DC voltage having a predetermined level to an AC voltage using a switching pulse signal having a frequency of tens of kilohertz (kHz) to tens of megahertz (MHz). In other words, the power converter 114 converts a DC voltage to an AC voltage using a resonant frequency, and generates the wake-up power or the charging power be used in a target device. However, it will be apparent to one of ordinary skill in the art that other techniques may be used to generate the wake-up power or the charging power.

The wake-up power may refer to a low power of 0.1 to 1 milliwatts (mW), and the charging power may refer to a high power of 1 mW to 200 Watts (W) that may be consumed by a device load of a target device. However, these ranges are only examples, and other ranges may be used. Herein, the term "charging" may be used to mean supplying a power to an element or a unit that charges a device with a power. Also, the term "charging" may be used to mean supplying a power to an element or a unit that consumes a power. For example, the term "charging power" may refer to a power consumed for an operation of a target device, or a power necessary for charging a battery or other energy storage element of the target device. The unit or the element may include, for example, a battery, a display device, a sound output circuit, a main processor, and various types of sensors.

The control/communication unit 115 controls a frequency of a switching pulse signal. Under the control of the control/communication unit 115, the frequency of the switching pulse signal may be determined.

The control/communication unit 115 performs out-band communication using a communication channel. The control/communication unit 115 may include a communication module, such as a ZigBee module, a Bluetooth module, and the like. The control/communication unit 115 transmits or receives data to or from the target device 120 via the out-band communication.

The control/communication unit 126 selects a controlling communication channel to be used for performing communication with the target device 120. The control/communication unit 126 searches for an available controlling communication channel based on detection of a carrier signal, selects a controlling communication channel to be used for performing communication with the target device 120 based on a result of the searching for the available controlling communication channel, and transmits, to the target device 120, an initial control signal including an identifier (ID) of the source device 110 and a channel fix command through the selected controlling communication channel.

The control/communication unit 126 a first communication channel from N communication channels, determines whether a carrier signal is detected through the first communication channel, determines whether a level of the detected carrier signal is greater than or equal to a predetermined value if the carrier signal is detected, selects a second communication channel from the N communication channels when the level of the carrier signal is greater than or equal to the predetermined value, and determines whether a carrier signal is detected through the second communication channel. N is an integer greater than or equal to 2.

The control/communication unit 115 transmits, to the target device 120, a wake-up request signal for initial communication, and receives, from the target device 120, information about a receiving sensitivity of the wake-up request signal and/or information about a receiving level of the charging power using an out-band communication scheme. The control/communication unit 115 detects a target device that is located within a power transmission area of the source device 110 based on the information about the receiving sensitivity of the wake-up request signal and/or the information about the receiving level of the charging power. If the receiving sensitivity of the wake-up request signal is greater than or equal to a predetermined value and/or the receiving level of the charging power is greater than or equal to a predetermined value, the control/communication unit 115 determines a target device transmitting the information about the receiving sensitivity of the wake-up request signal and/or the information about the receiving level of the charging power to be the target device located within the power transmission area of the source device 110.

The control/communication unit 115 transmits, to the target device 120, a wake-up request signal for initial communication, controls a predetermined transmitting timing of the charging power, and receives, from the target device 120, information about a receiving sensitivity of the wake-up request signal and/or information about a wake-up time of the target device 120 and a receiving timing of the charging power using an out-band communication scheme. The control/communication unit 115 detects a target device that is located within the power transmission area of the source device 110 based on the information about the receiving sensitivity of the wake-up request signal and/or the information about the wake-up time of the target device and the receiving timing of the charging power. If the receiving sensitivity of the wake-up request signal is greater than or equal to a predetermined value and/or the information about the receiving timing of the charging power matches the predetermined transmitting timing of the charging power, the control/communication unit 115 may determine a target device transmitting the information about the receiving sensitivity of the wake-up request signal and the information about the receiving timing of the charging power to be the target device located within the power transmission area of the source device 110.

The source resonator 116 transfers electromagnetic energy to the target resonator 121. Specifically, the source resonator 116 transfers, to the target device 120, the wake-up power or the charging power using a magnetic coupling with the target resonator 121.

The target resonator 121 receives the electromagnetic energy from the source resonator 116. Specifically, the target resonator 12 receives, from the source device 110, the wake-up power used to activate a communication and control function or the charging power used for charging using a magnetic coupling with the source resonator 116.

The rectification unit 122 generates a DC voltage by rectifying an AC voltage. That is, the rectification unit 122 rectifies an AC voltage received by the target resonator 121.

The DC/DC converter 123 adjusts a level of the DC voltage output from the rectification unit 122 based on a voltage rating of the device load 125. For example, the DC/DC converter 123 may adjust the level of the DC voltage output from the rectification unit 122 to a level in a range of 3 volts (V) to 10 V.

The switch unit 124 is turned on or off under the control of the control/communication unit 126. If the switch unit 124 is turned off, the control/communication unit 115 of the source device 110 will detect a reflected wave. In other words, if the switch unit 124 is turned off, the magnetic coupling between the source resonator 116 and the target resonator 121 is interrupted.

The device load 125 is a load formed by a unit consuming power. The device load 125 may include a battery, a display device, a sound output circuit, a main processor, and various types of sensors. If the device load 125 includes a battery, the device load 125 charges the battery using a DC voltage that is output from the DC/DC converter 123.

In FIG. 1, the control/communication unit 126 and the communication module (not shown) are activated by the wake-up power. The control/communication unit 126 is activated by the wake-up power, and selects a first communication channel from N communication channels, N being greater than or equal to 2. The control/communication unit 126 determines whether a carrier signal is detected through the first communication channel, determines whether an initial control signal including a channel fix command is received from the source device 110 if the carrier signal is detected through the first communication channel, and transmits, to the source device 110, a signal in response to the channel fix command if the initial control signal is received. If a carrier signal is not detected through the first communication channel, the control/communication unit 126 selects a second communication channel from the N communication channels, and determines whether a carrier signal is detected through the selected second communication channel.

The communication module (not shown) is activated by the wake-up power. The communication module receives, from the source device 110, a wake-up request signal for initial communication, and transmits, to the source device 110, information about a receiving sensitivity of the wake-up request signal and information about a receiving level of the charging power. The communication module transmits and receives data to and from the source device 110 using an out-band communication scheme.

The control/communication unit 126 detects information about a receiving sensitivity of the wake-up request signal, a receiving level of the charging power, and a receiving timing of the charging power. The information about the receiving level of the charging power and the receiving timing of the charging power may be measured between the target resonator 121 and the rectification unit 122, or between the rectification unit 122 and the DC/DC converter 123.

Figure 2:
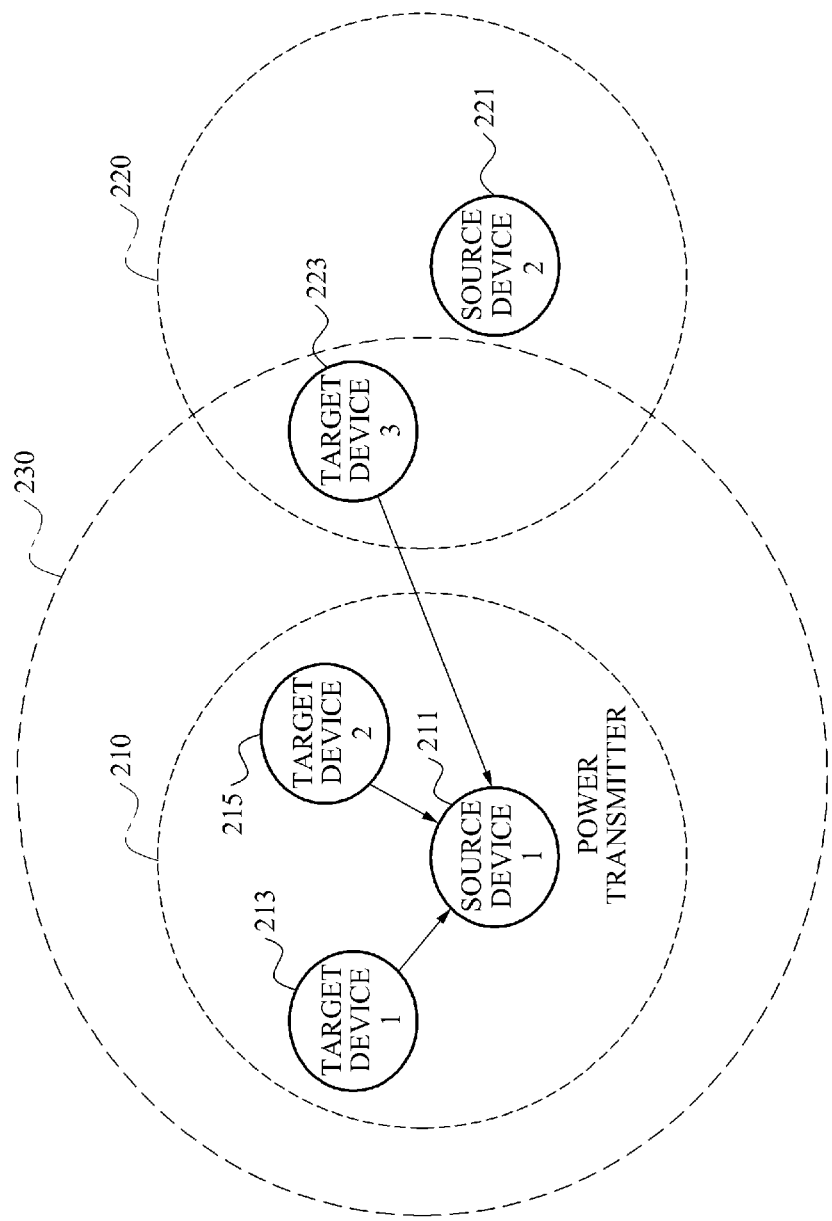
FIG. 2 is a diagram illustrating a multi-source environment according to an example.

FIG. 2 is a diagram illustrating a multi-source environment according to an example. Referring to FIG. 2, the multi-source environment includes a plurality of source devices, for example, a source device 1 211 and a source device 2 221. A power transmission area 210 of the source device 1 211 is set to avoid an overlap with a power transmission area 220 of the source device 2 221. The source device 2 221 is referred to as a neighboring source device that is located within a predetermined distance from the source device 1 211.

A target device 1 213 and a target device 2 215 are located within the power transmission area 210 of the source device 1 211. A target device 3 223 is located within the power transmission area 220 of the source device 2 221. Accordingly, a target resonator of the target device 3 223 may receive, from the source device 2 221, a wake-up power to be used for activating a communication and control function through a magnetic coupling.

If an out-band communication scheme is used in the multi-source environment, a coverage area 230 of the source device 1 211, in which communication is possible, may be formed to be broader than the power transmission area 210 as shown in FIG. 2. Each of the plurality of source devices, for example, the source device 1 211 and the source device 2 221, need to accurately detect a target device existing within an area in which power transmission is possible. The target device 3 223 is located within the power transmission area 220 of the source device 2 221, and is also located within the coverage area 230 of the source device 1 211. The target device 3 223 may receive a wake-up power from the source device 2 221, and may receive a wake-up request signal from the source device 1 211. Accordingly, a communication module of the target device 3 223 may be activated by the wake-up power received from the source device 2 221, and may receive, from the source device 1 211, the wake-up request signal for initial communication. When If the wake-up request signal for initial communication is received by the communication module of the target device 3 223 from the source device 1 211, the communication module of the target device 3 223 transmits, to the source device 1 211, information about a receiving sensitivity of the wake-up request signal.

The source device 1 211 needs to recognize that the target device 3 223 is outside the power transmission area 210 of the source device 1 211. The source device 1 211 assigns a controlling ID to each of the target device 1 213 and the target device 2 215 that are located within the power transmission area 210 of the source device 1 211. The controlling ID is an ID used by a source device to identify a target device in a charging mode.

Figure 3:
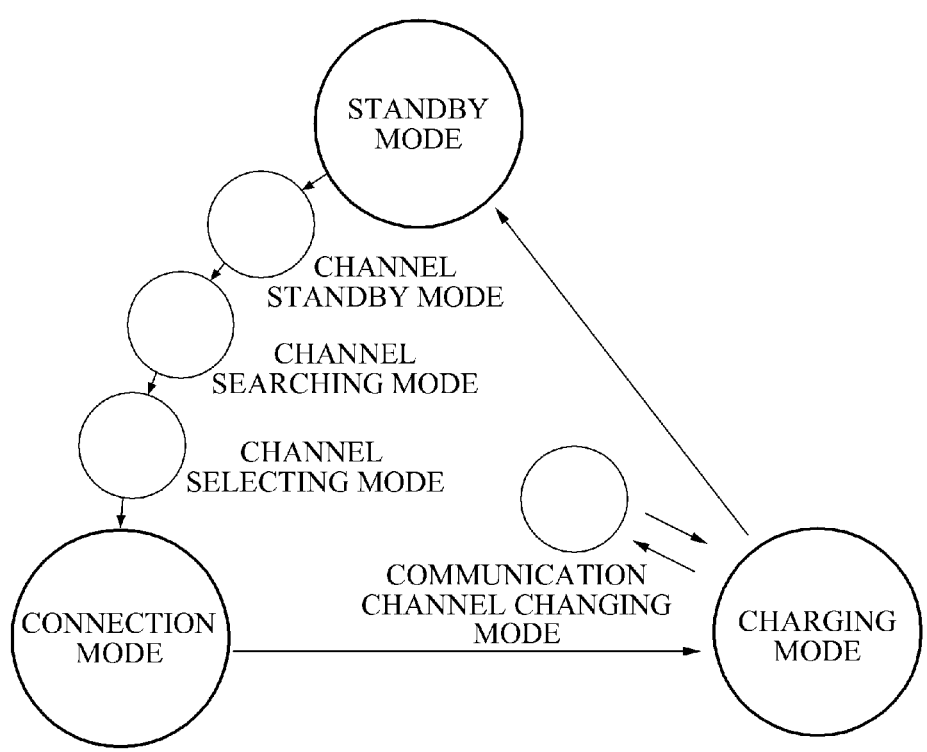
FIG. 3 is a diagram illustrating operating modes of a wireless power transmission and charging system according to an example.

FIG. 3 is a diagram illustrating operating modes of a wireless power transmission and charging system according to an example. Referring to FIG. 3, operating modes of the wireless power transmission and charging system may be classified primarily into a standby mode, a connection mode, and a charging mode. The standby mode is a state in which a source device does not perform any operations since there is no target device in a power transmission area of the source device. If the standby mode is terminated by a predetermined event, the source device searches for a channel to be used for performing out-band communication. The predetermined event may be an event in which a target device is detected. For example, the target device may be detected by a predetermined sensor. Alternatively, the source device may transmit a wake-up power at a predetermined interval, and may detect a change in an impedance or a change in a reflected wave, thereby detecting a target device. The source device detects a channel state of a plurality of communication channels, and selects a channel having a best channel state among the plurality of communication channels. If the channel having the best channel state is selected, the source device operates in the connection mode. The source device transmits the wake-up request signal through the channel having the best channel state. The connection mode is a mode in which the source device and the target device transmit and receive data. The charging mode is a mode in which the source device transmits a charging power and the target device receives the charging power. The operating modes illustrated in FIG. 3 are only examples, and various other operating modes may be provided. In the charging mode, the source device verifies a quality of a communication channel, and may operate in a communication channel changing mode. Since a communication channel may be changed using an out-band communication scheme, the charging power may be transmitted continuously. In the communication channel changing mode, the source device verifies the quality of the communication channel, and transmits, to the target device, a command requesting the target device to change a communication channel.

In FIG. 3, a channel standby mode is a mode in which preparations for detecting a carrier signal are made. The source device activates a circuit used for detecting a carrier signal in the channel standby mode. A channel searching mode is a mode in which an empty channel is searched for by detecting a carrier signal. A channel selecting mode is a mode in which a controlling communication channel is selected based on whether the carrier signal is detected, and a level of the detected carrier signal. Also, in the channel selecting mode, the target device selects the controlling communication channel by performing a channel search. That is, if the target device is activated by the wake up power, the target device performs an operation of searching for the controlling communication channel.

If channels 1 through N are available, the source device determines which channel to begin the search with. The channel search may be performed in a descending sequence, an ascending sequence, and various random sequences. Also, the sequence in which the channel search is performed may be depend on a type of the source device, or a unique ID assigned to the source device, so that channel searches for different types of source devices, or source devices having different unique IDs, may be performed in different sequences to avoid collisions between channels in the multi-source environment. The following Table 1 shows an example of different sequences for performing a channel search that are based on the type of the source device or the unique ID assigned to the source device. However, other sequences may be used.

TABLE 1

|  |  | Sequence of performing channel search (N = 7) |  |  |  |  |  |  |
|---|---|---|---|---|---|---|---|---|
| Type of source device | Type 1 | 1 | 2 | 3 | 4 | 5 | 6 | 7 |
|  | Type 2 | 4 | 3 | 2 | 1 | 7 | 6 | 5 |
|  | Type 3 | 2 | 3 | 4 | 5 | 6 | 7 | 1 |
|  | Type 4 | 3 | 4 | 5 | 6 | 7 | 1 | 2 |
|  | Type 5 | 7 | 6 | 5 | 4 | 3 | 2 | 1 |
| ID of source device | Unique ID 1 | 7 | 6 | 5 | 4 | 3 | 2 | 1 |
|  | Unique ID 2 | 6 | 7 | 1 | 2 | 3 | 4 | 5 |
|  | Unique ID 3 | 5 | 6 | 7 | 3 | 2 | 1 | 4 |
|  | Unique ID 4 | 4 | 3 | 2 | 1 | 7 | 6 | 5 |
|  | Unique ID 5 | 1 | 2 | 3 | 4 | 5 | 6 | 7 |

Figure 4:
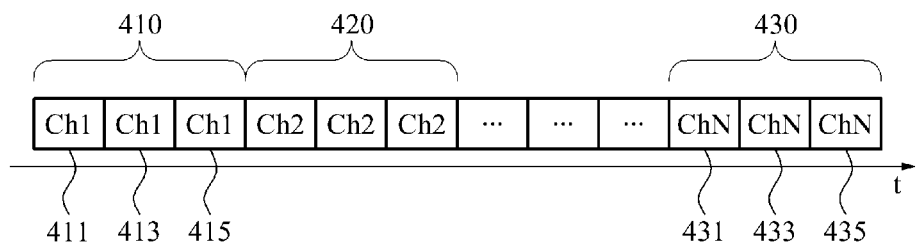
FIG. 4 is a diagram illustrating a method of selecting a channel performed by a source device according to an example.

FIG. 4 is a diagram illustrating a method of selecting a channel performed by a source device according to an example. The source device sequentially or randomly verifies states of N channels. In FIG. 4, a segment 410 includes time periods for verifying a state of a channel 1 Ch1, a segment 420 includes time periods for verifying a state of a channel 2 Ch2, and a segment 430 includes time periods for verifying a state of a channel 3 ChN.

The source device prepares to detect a carrier signal of Ch1 during a time period 411. That is, the time period 411 corresponds to the channel standby mode in FIG. 3. The source device measures a level of the carrier signal of Ch1 a predetermined number of times during a time period 413. The source device verifies whether the level of the carrier signal of Ch1 is greater than or equal to a predetermined value during a time period 415. If a level of a carrier signal of Ch1 is greater than or equal to the predetermined value, this indicates that Ch1 is being used by another source device. If the level of the carrier signal of Ch1 is greater than or equal to the predetermined value, the source device verifies a state of Ch2 during the time periods of the segment 420. If the level of the carrier signal of Ch1 is less than the predetermined value, the source device selects Ch1 as a controlling communication channel to be used for performing communication with a target device.

If all of the channels Ch1 to ChN−1 are being used by other source devices, the source device verifies a state of ChN during time periods of the segment 430. The source device prepares to detect a carrier signal of ChN during a time period 431. The source device measures a level of the carrier signal of ChN a predetermined number of times during a time period 433. The source device verifies whether the level of the carrier signal of ChN is greater than or equal to a predetermined value during a time period 435. If it is determined that ChN is also being used by another source device, the source device reverifies the state of the channel 1 Ch1

Figure 5:
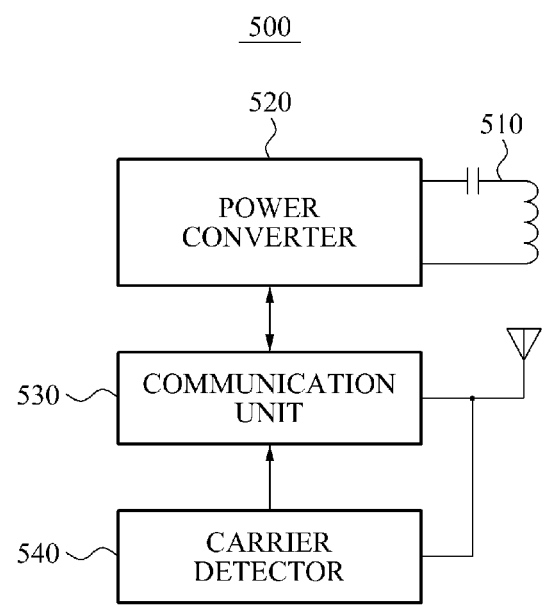
FIG. 5 is a diagram illustrating a configuration of a source device according to an example.

FIG. 5 is a diagram illustrating a configuration of a source device according to an example. Referring to FIG. 5, a source device 500 includes a source resonator 510, a power converter 520, a communication unit 530, and a carrier detector 540. The communication unit 530 performs out-band communication. The carrier detector 540 may include a comparator (not shown) configured to compare a level of a signal with a predetermined value, and an analog-to-digital converter (ADC) (not shown) configured to convert an analog signal to a digital signal.

Figure 6:
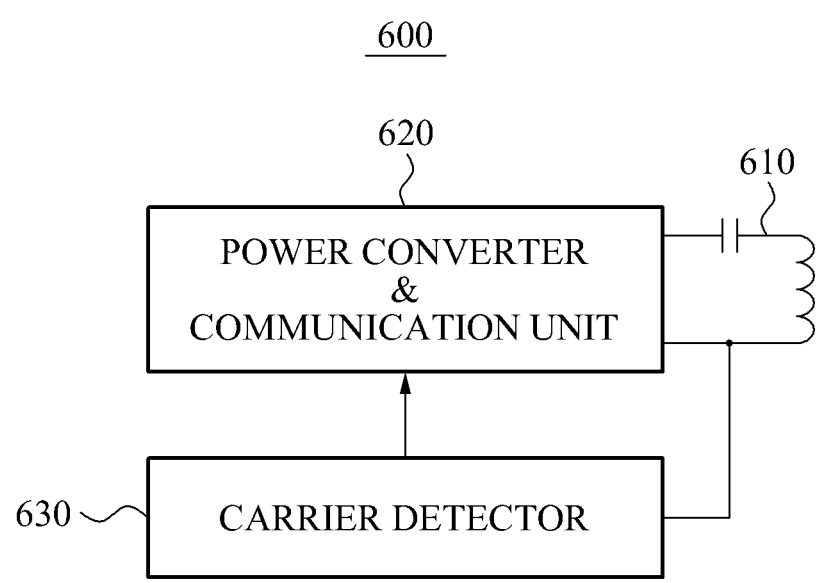
FIG. 6 is a diagram illustrating a configuration of a source device according to an example.

FIG. 6 is a diagram illustrating a configuration of a source device according to an example. Referring to FIG. 6, a source device 600 includes a source resonator 610, a power converter & communication unit 620, and a carrier detector 630. The power converter & communication unit 620 performs both in-band communication and a function of the power converter 114 in FIG. 1. In-band communication is a communication scheme in which data is transmitted and received using a resonant frequency that is also used to transmit power.

Figure 7:
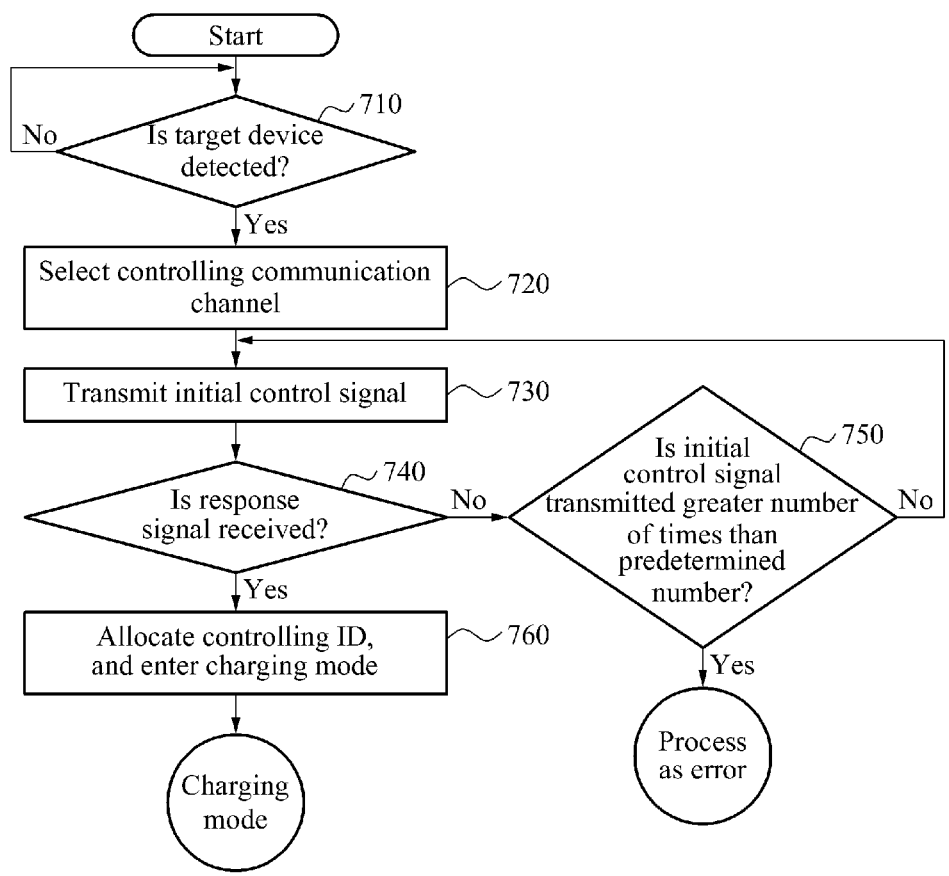
FIGS. 7 and 8 are flowcharts illustrating a method of allocating a communication channel and transmitting a power according to an example.
Figure 8:
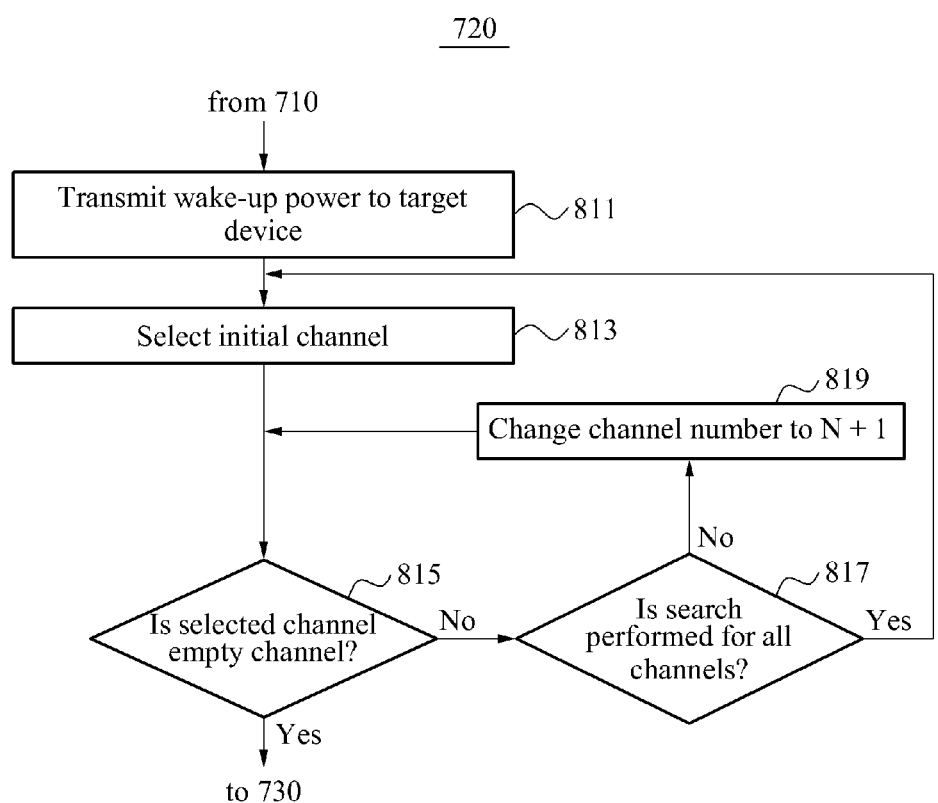

FIGS. 7 and 8 are flowcharts illustrating a method of allocating a communication channel and transmitting a power according to an example. The method illustrated in FIGS. 7 and 8 may be performed by a source device, such as the source devices 110, 500, and 600 in FIGS. 1, 5, and 6. Referring to FIG. 7, in 710, the source device determines whether a target device is detected. That is, the source device operates in a standby mode in 710.

If a target device wirelessly receiving a power from the source device is detected in 710, the source device selects a controlling communication channel to be used for performing communication with the detected target device in 720. The selecting of the controlling communication channel includes 811 through 819 in FIG. 8.

Referring to FIG. 8, in 811, the source device transmits, to the target device, a wake-up power that is used to activate a communication function and a control function of the target device.

In 813 through 819, the source device searches for an available controlling communication channel based on detection of a carrier signal, and selects a controlling communication channel to be used for performing communication with the target device based on a result of the searching for the available controlling communication channel. That is, in 813, the source device selects an initial channel. In other words, the source device selects a first communication channel from N communication channels. N is an integer greater than or equal to 2.

In 815, the source device determines whether the selected channel (which will be the initial channel the first time 815 is performed) is an empty channel. That is, the source device determines whether a carrier signal is detected through the first communication channel. If a carrier signal is detected, the source device determines whether a level of the detected carrier signal is greater than or equal to a predetermined value.

If the level of the detected carrier signal is less than the predetermined value, the first communication channel is determined to be an empty channel.

If a carrier signal is not detected through the first communication channel, or if the level of the carrier signal detected through the first communication channel is less than the predetermined value, the source device selects the first communication channel as the controlling communication channel.

If the level of the detected carrier signal is greater than or equal to the predetermined value, the source device selects a second communication channel from the N communication channels, and determines whether a carrier signal is detected through the second communication channel.

That is, by performing 815 for all of the N channels, the source device determines whether each of the N channels is an empty channel. In 817, the source device determines whether the search has been performed for all of the N channels. If the search has been performed for all of the N channels, the source device performs 813 again. If the search has not been performed for all of the N channels, the source device changes a channel number in 819, and performs 815 again.

Referring again to FIG. 7, in 730, the source device transmits, to the target device, an initial control signal including an ID of the source device and a channel fix command through the selected controlling communication channel. The channel fix command is a command requesting the target device to use the selected controlling communication channel. The initial control signal may be transmitted during consecutive time periods, based on an amount of time used by the target device for scanning the N communication channels. For example, if a 1 millisecond (ms) time period is used by the target device for scanning all of the N communication channels, the initial control signal may be transmitted continuously for 1 ms. An amount of time used for scanning a communication channel may be set to vary according to a communication standard being used.

In 740, the source device determines whether a response signal is received from the target device in response to the channel fix command. If the response signal is not received within a predetermined time, the source device performs 750. If the response signal is received, the source device performs 760.

In 750, the source device determines whether the initial control signal has been transmitted a greater number of times than a predetermined number. If the initial control signal has been transmitted a greater number of times than the predetermined number, the detection of the target device is processed as an error.

In 760, the source device allocates a controlling ID to the target device, and enters a charging mode in which a charging power used for charging the target device is transmitted to the target device. In the charging mode, the source device performs methods illustrated in FIGS. 9 through 11, in parallel or selectively.

Figure 9:
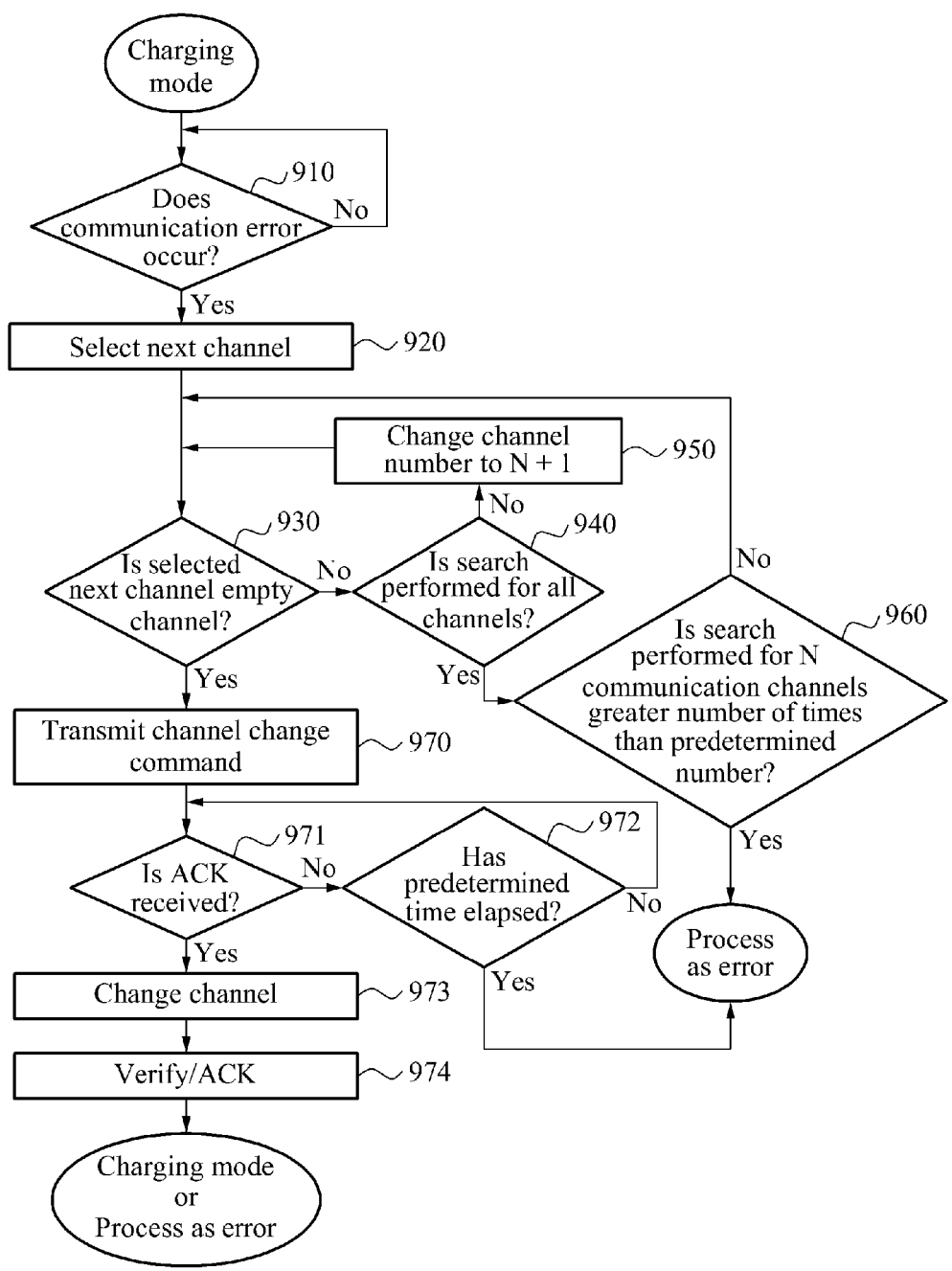
FIG. 9 is a flowchart illustrating a method of allocating a communication channel and transmitting a power according to an example.

FIG. 9 is a flowchart illustrating a method of allocating a communication channel and transmitting a power according to an example. Referring to FIG. 9, a source device determines whether a communication error occurs in 910. That is, the source device determines whether a communication error occurs while the source device is operating in a charging mode.

If a communication error occurs in the charging mode, the source device searches for an empty channel among N communication channels, and changes a controlling communication channel to the empty channel. N is an integer greater than or equal to 2.

In 920, the source device selects a next channel. The next channel may be any channel excluding a controlling communication channel that is currently in use among the N communication channels.

In 930, the source device determines whether the selected next channel is an empty channel. If the selected next channel is not an empty channel, the source device performs 940 and 950, which are the same as 817 and 819 in FIG. 8, so the descriptions thereof will not be repeated here. In 960, the source device determines whether the search has been performed for the N communication channels a greater number of times than a predetermined number. If the search has been performed for the N communication channels a greater number of times than the predetermined number, the process for changing the channel is processed as an error.

If an empty channel is found as a result of performing 930 through 960, the source device transmits, to the target device, a channel change command through the selected controlling communication channel in 970. The selected controlling communication channel is a controlling communication channel that is currently in use. The channel change command is a command requesting the target device to change the controlling communication channel to the found empty channel.

In 971, the source device determines whether an acknowledgement (ACK) is received in response to the channel change command. In 972, the source device determines whether a predetermined time has elapsed. If the predetermined time has elapsed, the process for changing the channel is processed as an error. If the ACK is received within the predetermined time, the source device changes the channel in 973. That is, in 973, the source device changes the controlling communication channel to the found empty channel if the ACK is received in response to the channel change command.

In 974, the source device verifies whether the channel has been changed. That is, the source device inquires of the target device as to whether the channel of the target device has been changed, and receives, from the target device, an ACK regarding whether the channel has been changed in 974. If the target device does not verify that the channel of the target device has been changed, the source device processes the process for changing the channel as an error. If the target device verifies that the channel of the target device has been changed, the source device operates in a charging mode. In a case of an out-band communication scheme, power transmission and communication may be performed simultaneously. Accordingly, power may be transmitted continuously during time periods in which the process illustrated in FIG. 9 is performed.

Figure 10:
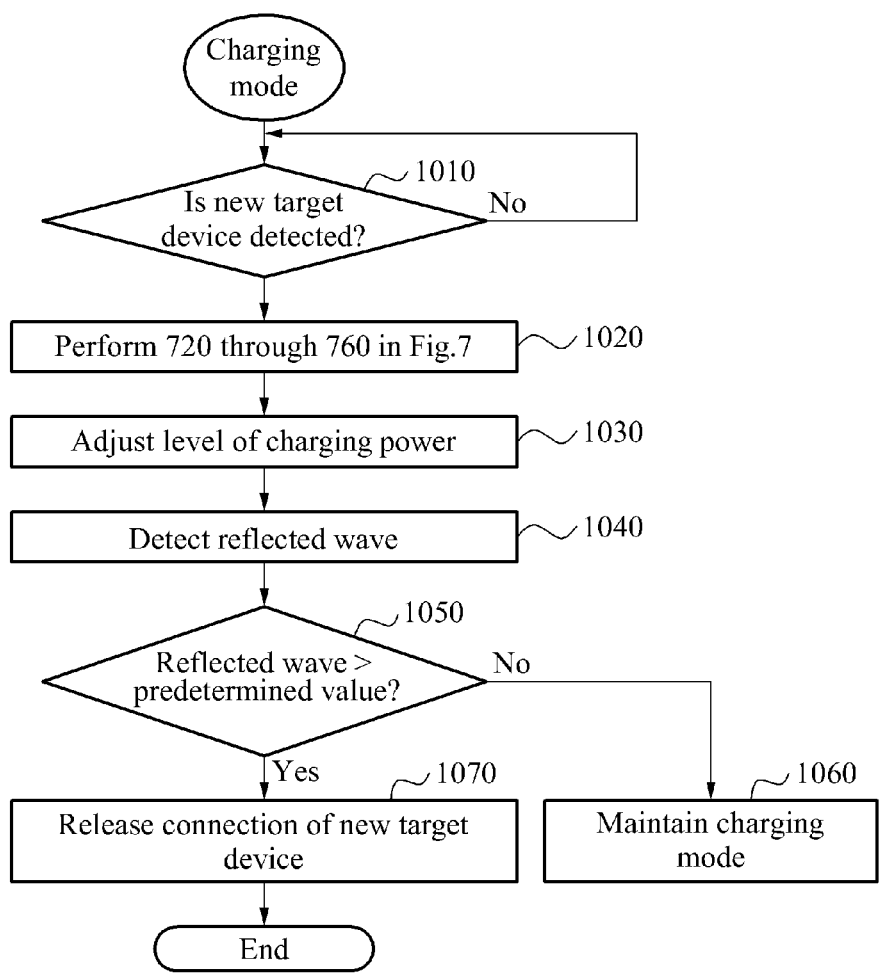
FIG. 10 is a flowchart illustrating a method of allocating a communication channel and transmitting a power according to an example.

FIG. 10 is a flowchart illustrating a method of allocating a communication channel and transmitting a power according to an example. The method illustrated in FIG. 10 is performed if a source device detects a new target device when the source device is operating in a charging mode. If the source device detects a new target device when the source device is operating in the charging mode, the source device allocates a controlling ID to the detected new target device, and increases a level of a charging power being transmitted by the source device.

Referring to FIG. 10, in 1010, the source device determines whether a new target device is detected. If a new target device is detected, the source device allocates a controlling ID to the newly detected target device in 1020 by performing 720 through 760 in FIG. 7.

In 1030, the source device adjusts a level of the charging power based on a device load of the new target device. For example, if an amount of power consumed by a target device currently receiving the charging power is 5 Watts (W), and an amount of power consumed by the new target device is 5 W, the source device increases the level of the charging power from 5 W to 10 W.

A problem arises if the new target device corresponds to the target device 3 223 in FIG. 2 and the source device corresponds to the source device 1 211 in FIG. 2 in the multi-source environment in FIG. 2. Accordingly, in 1040, the source device detects a reflected wave. If the new target device corresponds to the target device 3 223 and the source device corresponds to the source device 1 211, a level of the reflected wave that is detected in 1040 will be greater than a level of a reflected wave that is detected before 1030 is performed.

In 1050, the source device determines whether the level of the reflected wave that is detected in 1040 is greater than a predetermined value. If the level of the reflected wave is greater than the predetermined value, the source device releases a connection of the new target device in 1070. If the level of the reflected wave that is detected in 1040 is less than or equal to the predetermined value, the source device maintains the charging mode in 1060, meaning that the source device maintains the level of the charging power that was adjusted in 1030.

Figure 11:
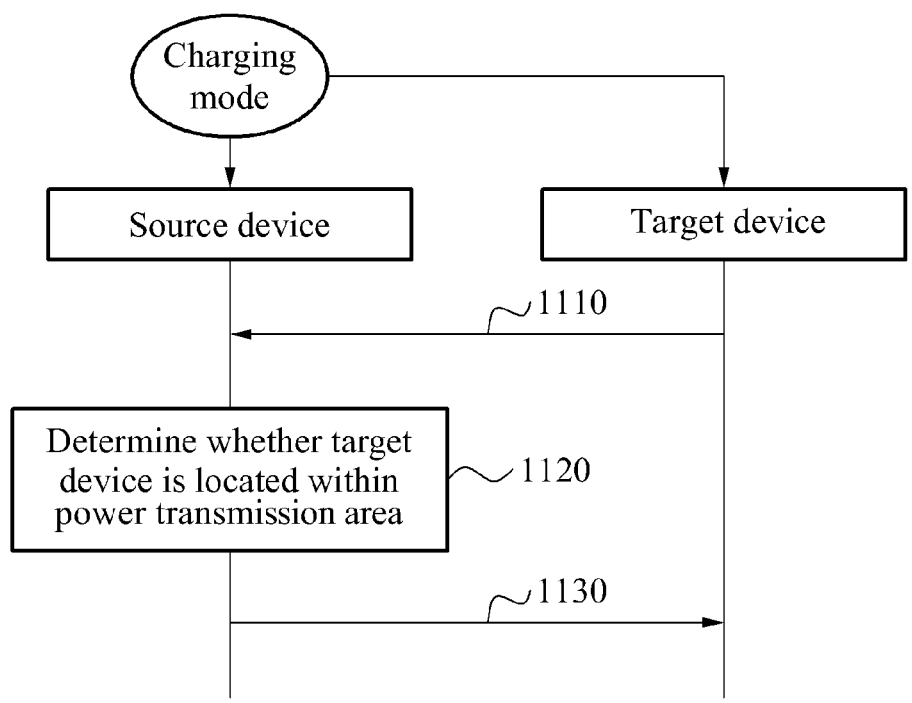
FIG. 11 is a flowchart illustrating a method of allocating a communication channel and transmitting a power according to an example.

FIG. 11 is a flowchart illustrating a method of allocating a communication channel and transmitting a power according to an example. FIG. 11 illustrates a method of accurately detecting, by a source device, a target device that is located within a power transmission area of the source device in a multi-source environment as illustrated in FIG. 2.

In 1110, the source device receives information about a receiving sensitivity of an initial control signal and/or information about a receiving level of a charging power from the target device.

In 1120, the source device determines whether the target device is located within a power transmission area of the source device based on the information about the receiving sensitivity of the initial control signal and/or and the information about the receiving level of the charging power.

If the receiving sensitivity of the initial control signal is greater than or equal to a predetermined value, and the receiving level of the charging power is greater than or equal to a predetermined value, the source device maintains transmission of the charging power in 1130. If the receiving level of the charging power is less than the predetermined value and/or the receiving sensitivity of the initial control signal is less than the predetermined value, the source device releases a connection of the target device in 1130.

Figure 12:
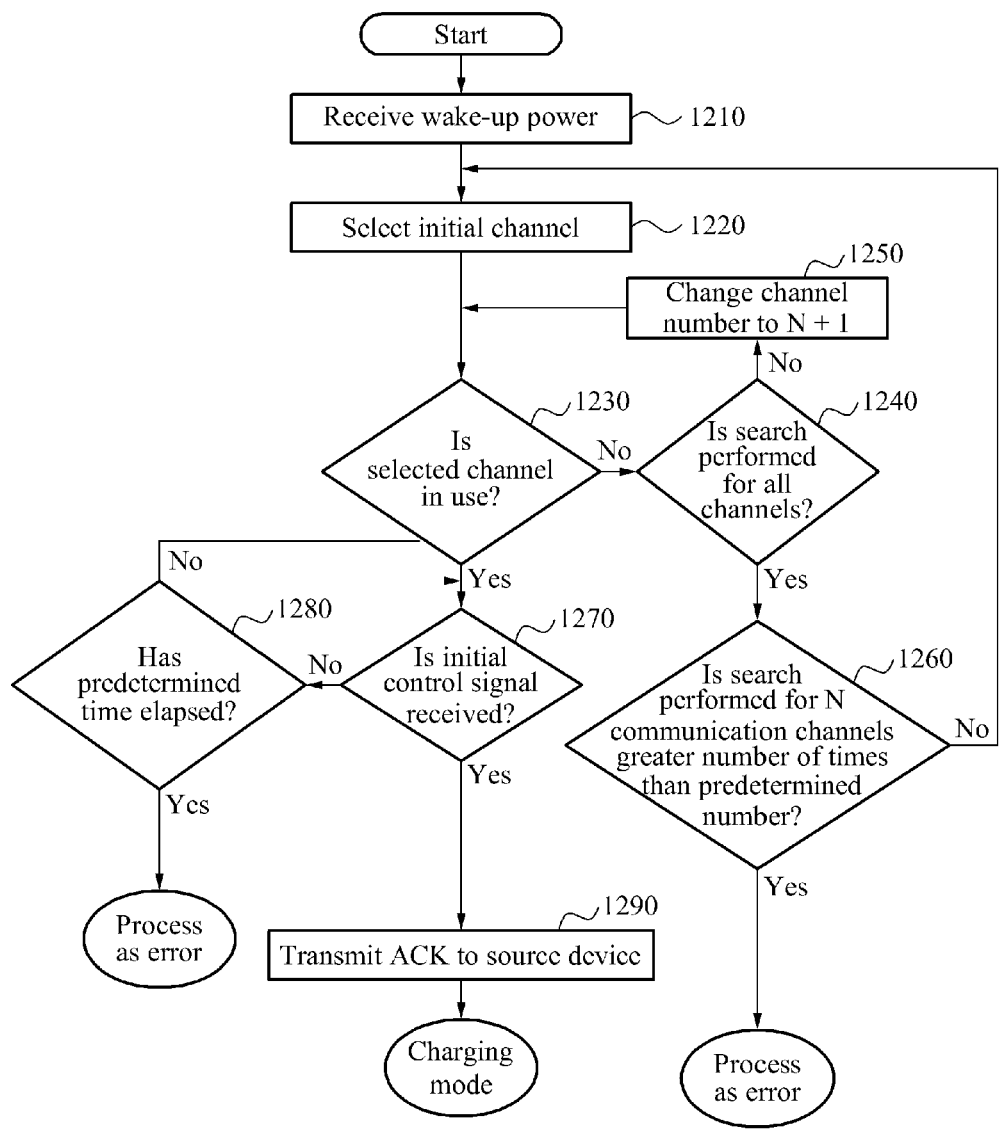
FIG. 12 is a flowchart illustrating an operation of a target device according to an example.

FIG. 12 is a flowchart illustrating an operation of a target device according to an example. Referring to FIG. 12, a target device receives, from a source device, a wake-up power that is used to activate a communication and control function of the target device in 1210. Also, the target device activates a communication module using the received wake-up power in 1210.

In 1220, the target device selects an initial channel. The initial channel may be any communication channel of N communication channels. That is, the target device selects a first communication channel from the N communication channels, which may be any communication channel of the N communication channels. N is an integer greater than or equal to 2.

In 1230, the target device determines whether the selected communication channel is in use. By determining whether a carrier signal is detected and measuring a level of the carrier signal, the target device determines whether the selected communication channel is in use. That is, the target device determines whether a carrier signal is detected through the first communication channel in 1230.

The target device performs 1240 through 1260, which are the same as 940 through 960 in FIG. 9, so the descriptions thereof will not be repeated here. Accordingly, if the first communication channel is not in use, the target device selects a second communication channel from the N communication channels in 1240 through 1260, and determines whether the second communication channel is in use in 1230.

If the selected communication channel is in use, the target device determines whether an initial control signal including a channel fix command is received from the source device in 1270. In 1280, the target device determines whether a predetermined time has elapsed. If the predetermined time has elapsed, the process for connecting to the source device is processed as an error. If the initial control signal is received within the predetermined time, the target device transmits, to the source device, a signal in response to the channel fix command, in 1290. That is, the target device transmits, to the source device, an ACK in response to the channel fix command in 1290.

Then, the target device receives, from the source device, a charging power used for charging the target device in a charging mode.

The target device also performs additional operations.

For example, the target device transmits, to the source device, information about a receiving sensitivity of the initial control signal and/or information about a receiving level of the charging power.

Also, the target device receives a controlling ID allocated by the source device based on the information about the receiving sensitivity of the initial control signal and/or the information about the receiving level of the charging power, which the source device.

Figure 13:
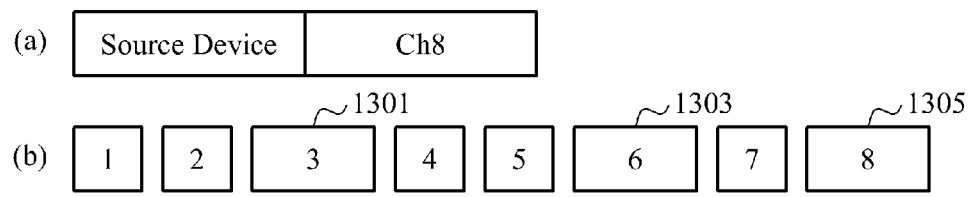
FIG. 13 is a diagram illustrating a method of searching for a channel performed by a target device according to an example.

FIG. 13 is a diagram illustrating a method of searching for a channel performed by a target device according to an example. An upper portion (a) in FIG. 13 shows that a source device has selected Ch8, that is, a channel 8, as a controlling communication channel. A lower portion (b) in FIG. 13 shows an example of channels that are searched by a target device. In this example, a channel 3 1301, a channel 6 1303, and a channel 8 1305 are in use, and a channel 1, a channel 2, a channel 4, a channel 5, and a channel 7 are not in use. First, the target device verifies that the channel 1 and the channel 2 are not in use because it does not detect a carrier signal through the channel 1 and the channel 2. Next, the target device verifies that the channel 3 1301 is in use because it detects a carrier signal through the channel 3 1301. The target device then determines whether an initial control signal of the source device is received through the channel 3 1301. However, in this example, the source device is transmitting the initial control signal through the channel 8 1305, so the target device does not receive the initial control signal through the channel 3 1301. Next, the target device verifies that the channel 4 and the channel 5 are not in use because it does not detect a carrier signal through the channel 4 and the channel 5. Next, the target device verifies that the channel 6 1303 is in use because it detects a carrier signal through the channel 6 1303. The target device then determines whether the initial control signal is received through the channel 6 1303. However, since the source device is transmitting the initial control signal through the channel 8 1305, so the target device does not receive the initial control signal through the channel 6 1303. Next, the target device verifies that the channel 7 is not in use because it does not detect a carrier signal through the channel 7. Next, the target device verifies that the channel 8 1305 is in use because it detects a carrier signal through the channel 8 1305. Finally, the target device determines that it receives the initial control signal through the channel 8 1305.

Figure 14A:
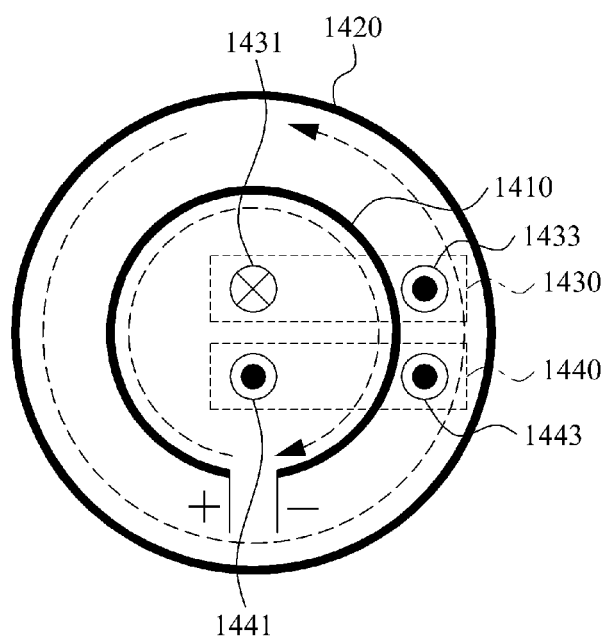
FIGS. 14A and 14B are diagrams illustrating a distribution of a magnetic field in a source resonator and a feeder according to an example.
Figure 14B:
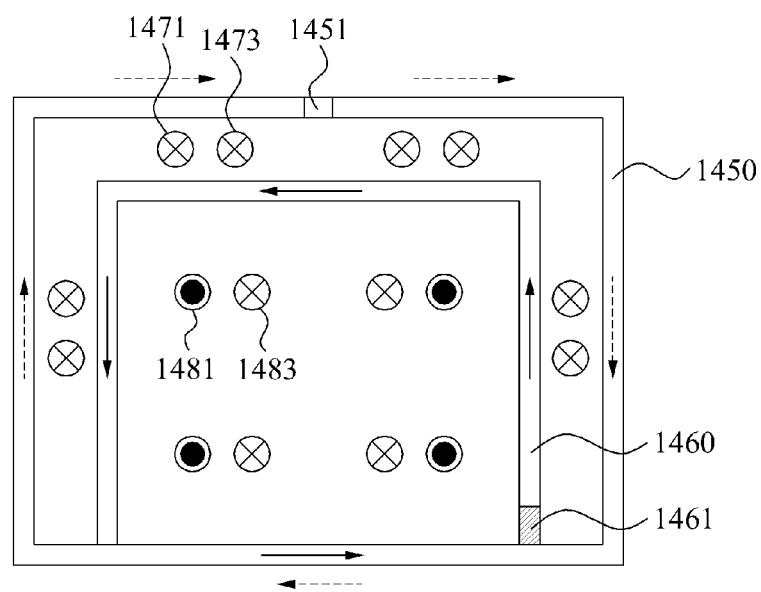

FIGS. 14A and 14B are diagrams illustrating a distribution of a magnetic field in a source resonator and a feeder according an example. In an example in which a source resonator receives a power supply through a separate feeder, magnetic fields may be generated in both the feeder and the source resonator.

Referring to FIG. 14A, if an input current flows through a feeder 1410, a magnetic field 1430 is generated. A direction 1431 of the magnetic field 1430 inside the feeder 1410 is opposite to a direction 1433 of the magnetic field 1430 outside the feeder 1410. The magnetic field 1430 generated by the feeder 1410 induces a current in a source resonator 1420 (hereinafter referred to as simply a resonator 1420). A direction of the induced current is opposite to a direction of the input current as indicated by the broken lines with arrowheads in FIG. 14A.

A magnetic field 1440 is generated in the resonator 1420 by the induced current. A direction of the magnetic field 1440 is the same at all positions in the resonator 1420. Accordingly, a direction 1441 of the magnetic field 1440 generated inside the feeder 1410 by the resonator 1420 has the same phase as a direction 1443 of the magnetic field 1440 generated outside the feeder 1410 by the resonator 1420.

Consequently, if the magnetic field 1430 generated by the feeder 1410 and the magnetic field 1440 generated by the resonator 1420 are combined, a strength of the total magnetic field decreases inside the feeder 1410, but increases outside the feeder 1410. Accordingly, if a power is supplied to the resonator 1420 through the feeder 1410 configured as illustrated in FIG. 14A, the strength of the total magnetic field decreases in the center of the resonator 1420, but increases near the outer periphery of the resonator 1420. If a magnetic field is randomly distributed in the resonator 1420, it is difficult to perform impedance matching because an input impedance will vary frequently. Additionally, if the strength of the total magnetic field increases, an efficiency of wireless power transmission increases. Conversely, if the strength of the total magnetic field decreases, the efficiency of wireless power transmission decreases.

FIG. 14B illustrates a structure of a wireless power transmitting unit in which a source resonator 1450 (hereinafter referred to as simply a resonator 1450) and a feeder 1460 have a common ground. The resonator 1450 includes a capacitor 1451. A radio frequency (RF) signal is input to the feeder 1460 via a port 1461.

If the RF signal is input to the feeder 1460, an input current is generated in the feeder 1460 as indicated by the solid lines with arrowheads in FIG. 14B. The input current flowing through the feeder 1460 generates a magnetic field, which induces a current in the resonator 1450 as indicated by the broken lines with arrowheads in FIG. 14A. In addition, another magnetic field is generated by the induced current flowing through the resonator 1450. In this example, a direction of the input current flowing through the feeder 1460 is opposite to a direction of the induced current flowing through the resonator 1450 as can be seen from FIG. 14B. Accordingly, in a region between the resonator 1450 and the feeder 1460, a direction 1471 of the magnetic field generated by the input current is the same as a direction 1473 of the magnetic field generated by the induced current, so that the strength of the total magnetic field increases. Conversely, inside the feeder 1460, a direction 1481 of the magnetic field generated by the input current is opposite to a direction 1483 of the magnetic field generated by the induced current, so that the strength of the total magnetic field decreases. Therefore, the strength of the total magnetic field decreases in the center of the resonator 1450, but near the outer periphery of the resonator 1450.

An input impedance of the feeder 1460 may be adjusted by adjusting an internal area of the feeder 1460. The input impedance is an impedance viewed in a direction from the feeder 1460 to the resonator 1450. If the internal area of the feeder 1460 is increased, the input impedance is increased. Conversely, if the internal area of the feeder 1460 is decreased, the input impedance is decreased. Since the magnetic field is randomly distributed inside the resonator 1450 despite a reduction in the input impedance, a value of the input impedance may vary depending on a location of a target device. Accordingly, a separate matching network may be required to match the input impedance to an output impedance of a power amplifier. For example, if the input impedance is increased, a separate matching network may be used to match the increased input impedance to a relatively low output impedance of a power amplifier.

Figure 15A:
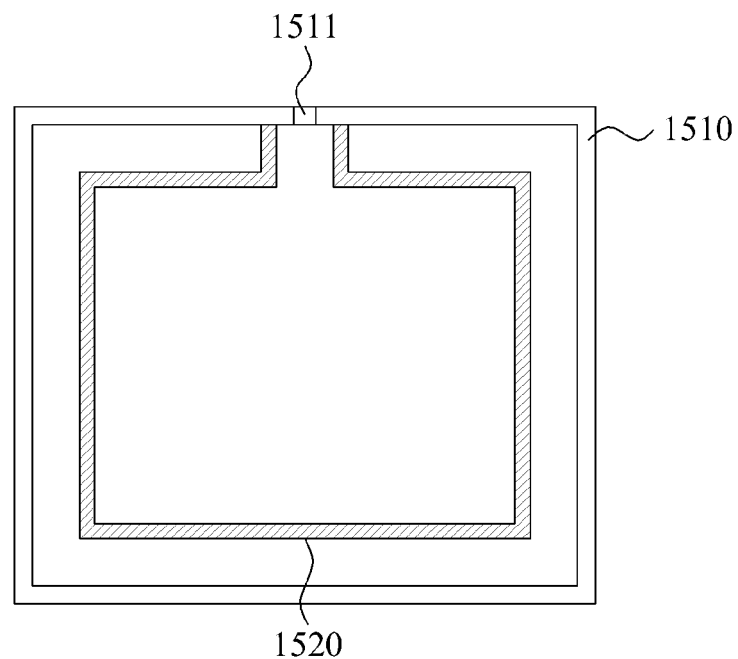
FIGS. 15A and 15B are diagrams illustrating a source resonator and a feeding unit according to an example.
Figure 15B:
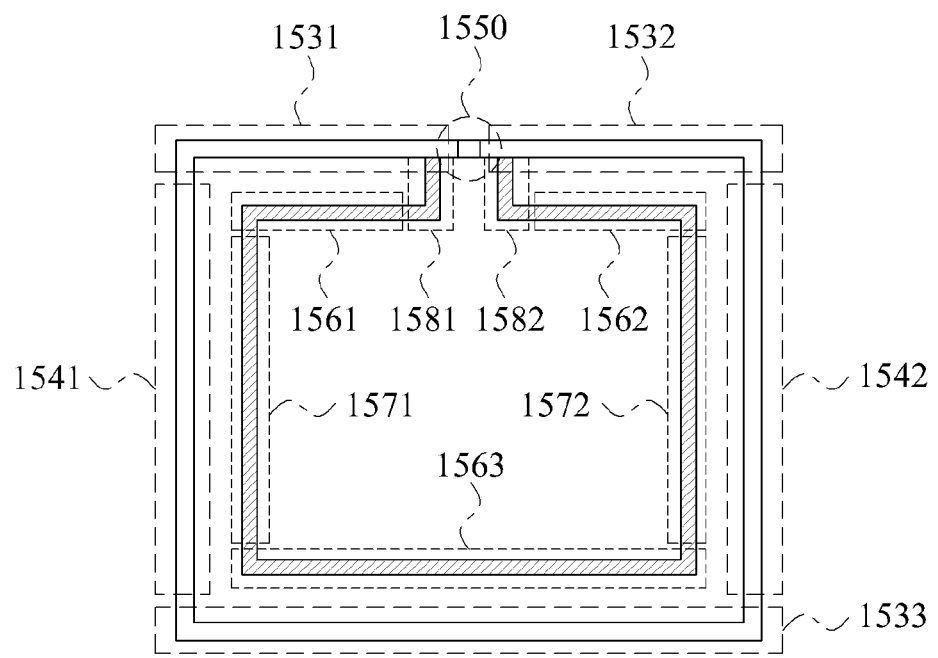

FIGS. 15A and 15B are diagrams illustrating a source resonator and a feeding unit according to an example. Referring to FIG. 15A, a source resonator 1510 (hereinafter referred to as simply a resonator 1510) includes a capacitor 1511. A feeding unit 1520 is electrically connected to both ends of the capacitor 1511.

FIG. 15B illustrates the configuration in FIG. 15A in more detail. The resonator 1510 includes a first transmission line (not identified by a reference numeral in FIG. 15B, but explained below), a first conductor 1541, a second conductor 1542, and at least one capacitor 1550.

The capacitor 1550 is inserted in series between a first signal conducting portion 1531 and a second signal conducting portion 1532, causing an electric field to be confined within the capacitor 1550. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 15B is separated into two portions that will be referred to as the first signal conducting portion 1531 and the second signal conducting portion 1532. A conductor disposed in a lower portion of the first transmission line will be referred to as a first ground conducting portion 1533.

As shown in FIG. 15B, the resonator 1510 has a two-dimensional (2D) structure. The first transmission line includes the first signal conducting portion 1531 and the second signal conducting portion 1532 in the upper portion of the first transmission line, and the first ground conducting portion 1533 in the lower portion of the first transmission line. The first signal conducting portion 1531 and the second signal conducting portion 1532 are disposed to face the first ground conducting portion 1533. A current flows through the first signal conducting portion 1531 and the second signal conducting portion 1532.

One end of the first signal conducting portion 1531 is connected to one end of the first conductor 1541, the other end of the first signal conducting portion 1531 is connected to one end of the capacitor 1550, and the other end of the first conductor 1541 is connected to one end of the first ground conducting portion 1532. One end of the second signal conducting portion 1532 is connected to one end of the second conductor 1542, the other end of the second signal conducting portion 1532 is connected to the other end of the capacitor 1550, and the other end of the second conductor 1542 is connected to the other end of the first ground conducting portion 1532. Accordingly, the first signal conducting portion 1531, the second signal conducting portion 1532, the first ground conducting portion 1533, the first conductor 1541, and the second conductor 1542 are connected to each other, causing the resonator 1510 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1550 is inserted into an intermediate portion of the first transmission line. Specifically, the capacitor 1550 is inserted into a space between the first signal conducting portion 1531 and the second signal conducting portion 1532. The capacitor 1550 may be a lumped element capacitor, a distributed element capacitor, and the like. In particular, a distributed element capacitor may include zigzagged conductor lines and a dielectric material having a relatively high permittivity between the zigzagged conductor lines.

The capacitor 1550 inserted into the first transmission line may cause the resonator 1510 to have a property of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector of the materials, so the materials may be referred to as right right-handed materials (RHMs). However, a metamaterial has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and the like, based on a sign of the magnetic permeability and/or permittivity of the metamaterial.

If the capacitor 1550 is a lumped element capacitor and a capacitance of the capacitor 1550 is appropriately determined, the resonator 1510 may have a characteristic of a metamaterial. If the resonator 1510 is caused to have a negative magnetic permeability by appropriately adjusting the capacitance of the capacitor 1550, the resonator 1510 may also be referred to as an MNG resonator. Various criteria may be applied to determine the capacitance of the capacitor 1550. For example, the various criteria may include a criterion for enabling the resonator 1510 to have a characteristic of a metamaterial, a criterion for enabling the resonator 1510 to have a negative magnetic permeability at a target frequency, a criterion for enabling the resonator 1510 to have a zeroth order resonance characteristic at the target frequency, and the like. Based on at least one criterion among the aforementioned criteria, the capacitance of the capacitor 1550 may be appropriately determined.

The resonator 1510, also referred to as the MNG resonator, may have a zeroth order resonance characteristic of having a resonant frequency when a propagation constant is "0." If the resonator 1510 has the zeroth order resonance characteristic, the resonant frequency is independent of a physical size of the resonator 1510. By changing the capacitance of the capacitor 1550, the resonant frequency of the resonator 1510 may be changed without changing the physical size of the resonator 1510.

In a near field, the electric field is concentrated in the capacitor 1550 inserted into the first transmission causing the magnetic field to become dominant in the near field. The resonator 1510 has a relatively high Q-factor when the capacitor 1550 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated, a magnetic core passing through the resonator 1510 may be provided to increase a power transmission distance.

Referring to FIG. 15B, the feeding unit 1520 includes a second transmission line (not identified by a reference numeral in FIG. 15B, but explained below), a third conductor 1571, a fourth conductor 1572, a fifth conductor 1581, and a sixth conductor 1582.

The second transmission line includes a third signal conducting portion 1561 and a fourth signal conducting portion 1562 in an upper portion of the second transmission line, and includes a second ground conducting portion 1563 in a lower portion of the second transmission line. The third signal conducting portion 1561 and the fourth signal conducting portion 1562 are disposed to face the second ground conducting portion 1563. A current flows through the third signal conducting portion 1561 and the fourth signal conducting portion 1562.

One end of the third signal conducting portion 1561 is connected to one end of the third conductor 1571, the other end of the third signal conducting portion 1561 is connected to one end of the fifth conductor 1581, and the other end of the third conductor 1571 is connected to one end of the second ground conducting portion 1563. One end of the fourth signal conducting portion 1562 is connected to one end the fourth conductor 1572, the other end of the fourth signal conducting portion 1562 is connected to the sixth conductor 1582, and the other end of the fourth conductor 1572 is connected to the other end of the second ground conducting portion 1563. The other end of the fifth conductor 1581 is connected to the first signal conducting portion 1531 at or near where the first signal conducting portion 1531 is connected to one end of the capacitor 1550, and the other end of the sixth conductor 1582 is connected to the second signal conducting portion 1532 at or near where the second signal conducting portion 1532 is connected to the other end of the capacitor 1550. Thus, the fifth conductor 1581 and the sixth conductor 1582 are connected in parallel to both ends of the capacitor 1550. The fifth conductor 1581 or the sixth conductor 1582 are used as an input port to receive an input of an RF signal.

Accordingly, the third signal conducting portion 1561, the fourth signal conducting portion 1562, the second ground conducting portion 1563, the third conductor 1571, the fourth conductor 1572, the fifth conductor 1581, the sixth conductor 1582, and the resonator 1510 are connected to each other, causing the resonator 1510 and the feeding unit 1520 to have an electrically closed loop structure. The term "loop structure" includes a polygonal structure, a circular structure, a rectangular structure, and any other geometrical structure that is closed, i.e. that does not have any opening in its perimeter. The term "loop structure" indicates a structure that is electrically closed.

If an RF signal is input to the fifth conductor 1581 or the sixth conductor 1582, an input current flows through the feeding unit 1520 and the resonator 1510, generating a magnetic field that induces a current in the resonator 1510. A direction of the input current flowing through the feeding unit 1520 is identical to a direction of the induced current flowing through the resonator 1510, thereby causing a strength of a total magnetic field to increase in the center of the resonator 1510, and decrease near the outer periphery of the resonator 1510.

An input impedance is determined by an area of a region between the resonator 1510 and the feeding unit 1520. Accordingly, a separate matching network may be unnecessary to match the input impedance to an output impedance of a power amplifier. However, if a matching network is used, the input impedance may be adjusted by adjusting a size of the feeding unit 1520, and accordingly a structure of the matching network may be simplified. The simplified structure of the matching network may reduce a matching loss of the matching network.

The second transmission line, the third conductor 1571, the fourth conductor 1572, the fifth conductor 1581, and the sixth conductor 1582 of the feeding unit 1520 may have a structure identical to the structure of the resonator 1510. For example, if the resonator 1510 has a loop structure, the feeding unit 1520 may also have a loop structure. As another example, if the resonator 1510 has a circular structure, the feeding unit 1520 may also have a circular structure.

Figure 16A:
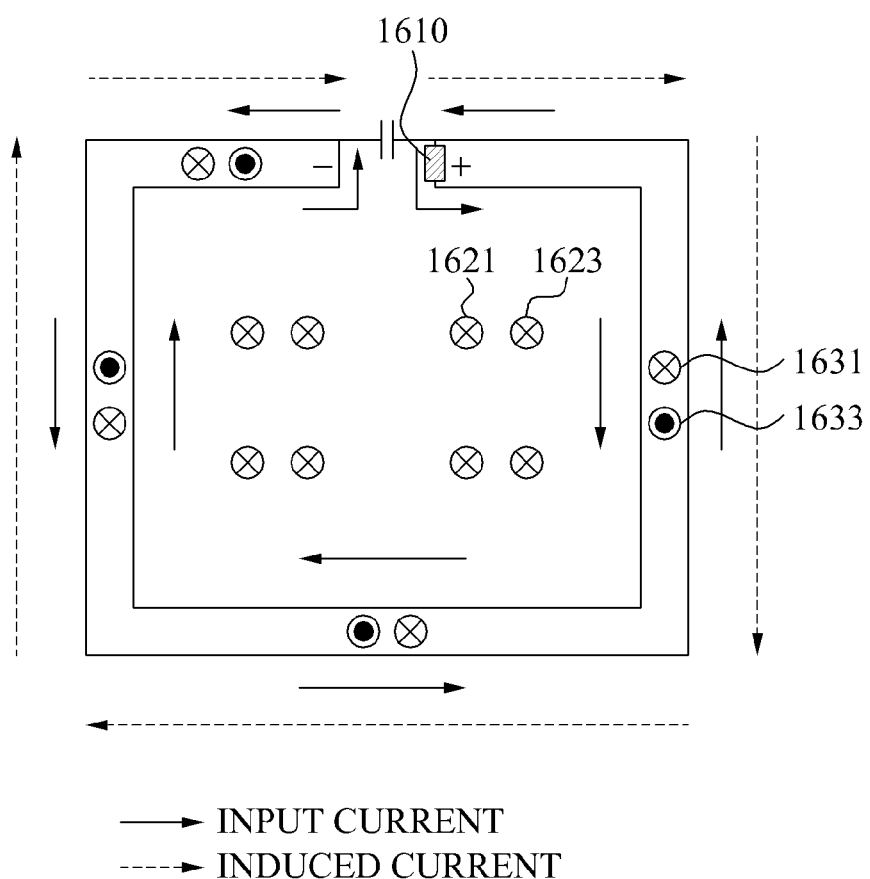
FIG. 16A is a diagram illustrating a distribution of a magnetic field in a resonator produced by feeding of a feeding unit according to an example.

FIG. 16A is a diagram illustrating a distribution of a magnetic field in a resonator produced by feeding of a feeding unit according to an example. In wireless power transmission, feeding may refer to supplying a power to a source resonator. Feeding may also refer to supplying an AC power to a rectification unit. FIG. 16A illustrates a direction of an input current flowing through a feeding unit, and a direction of a current induced in a source resonator. FIG. 16A also illustrates a direction of a magnetic field generated by the input current of the feeding unit, and a direction of a magnetic field generated by the induced current of the source resonator. The resonator 1510 and the feeding unit 1520 in FIGS. 15A and 15B are more simply illustrated in FIG. 16A, and the names of the various elements in FIG. 15B will be used in the following description of FIG. 16A without reference numerals.

Referring to FIG. 16A, a fifth conductor or a sixth conductor of a feeding unit may be used as an input port 1610. In FIG. 16A, the sixth conductor of the feeding unit is being used as the input port 1610. An RF signal is input to the input port 1610. The RF signal may be output from a power amplifier. The power amplifier may increase and decrease an amplitude of the RF signal based on a power requirement of a target device. The RF signal input via the input port 1610 is represented in FIG. 16A as an input current flowing through the feeding unit. The input current flowing through the feeding unit flows clockwise along a transmission line of the feeding unit. The fifth conductor and the sixth conductor of the feeding unit are electrically connected to a resonator. In particular, the fifth conductor is connected to a first signal conducting portion of the resonator, and the sixth conductor of the feeding unit is connected to a second signal conducting portion of the resonator. Accordingly, the input current flows through both the resonator and the feeding unit. The input current flows counterclockwise along a transmission line of the resonator. A magnetic field is generated by the input current flowing through the resonator, and the magnetic field induces a current in the resonator. The induced current flows clockwise along the transmission line of the resonator. The induced current in the resonator transfers energy to a capacitor of the resonator, and also generates a magnetic field. In FIG. 16A, the input current flowing through the feeding unit and the resonator are indicated by solid lines with arrowheads, and the induced current flowing through the resonator is indicated by broken lines with arrowheads.

A direction of a magnetic field generated by a current is determined based on the right-hand rule. Within the feeding unit, a direction 1621 of the magnetic field generated by the input current flowing through the feeding unit is identical to a direction 1623 of the magnetic field generated by the induced current flowing through the resonator. Accordingly, a strength of the total magnetic field increases inside the feeding unit.

In contrast, in a region between the feeding unit and the resonator, a direction 1633 of the magnetic field generated by the input current flowing through the feeding unit is opposite to a direction 1631 of the magnetic field generated by the induced current flowing through the resonator. Accordingly, the strength of the total magnetic field decreases in the region between the feeding unit and the resonator.

Generally, in a resonator having a loop structure, a strength of a magnetic field decreases in the center of the resonator, and increases near an outer periphery of the resonator. However, referring to FIG. 16A, since the feeding unit is electrically connected to both ends of a capacitor of the resonator, the direction of the induced current of the resonator is identical to the direction of the input current of the feeding unit. Since the direction of the induced current of the resonator is identical to the direction of the input current of the feeding unit, the strength of the total magnetic field increases inside the feeding unit, and decreases outside the feeding unit. Consequently, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Accordingly, the strength of the total magnetic field may be constant within the entire resonator.

Since a power transmission efficiency for transferring a power from a source resonator to a target resonator is proportional to a strength of a magnetic field generated in the source resonator, if the strength of the total magnetic field increases in the center of the source resonator, the power transmission efficiency also increases.

Figure 16B:
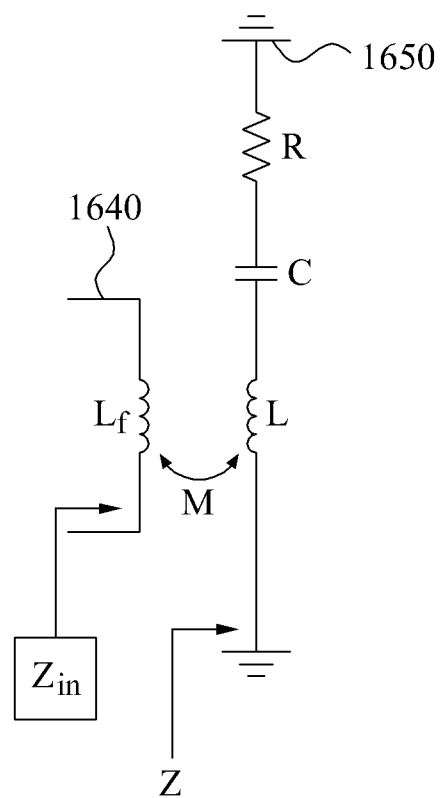
FIG. 16B is a diagram illustrating equivalent circuits of a feeding unit and a resonator according to an example.

FIG. 16B is a diagram illustrating examples of equivalent circuits of a feeding unit and a resonator according to an example. Referring to FIG. 16B, a feeding unit 1640 and a resonator 1650 may be represented by the equivalent circuits in FIG. 16B. The feeding unit 1640 is represented as an inductor having an inductance $L_f$, and the resonator 1650 is represented as a series connection of an inductor having an inductance L coupled to the inductance Lf of the feeding unit 1640 by a mutual inductance M, a capacitor having a capacitance C, and a resistor having a resistance R. An input impedance $Z_{in}$ viewed in a direction from the feeding unit 1640 to the resonator 1650 may be expressed by the following Equation 1.

$$Z_{in} = \frac{(\omega M)^2}{Z} \quad (1)$$

M denotes a mutual inductance between the feeding unit 1640 and the resonator 1650, ω denotes a resonant frequency of the feeding unit 1640 and the resonator 1650, and Z denotes an impedance viewed in a direction from the resonator 1650 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1640 and the resonator 1650. The area of the region between the feeding unit 1640 and the resonator 1650 may be adjusted by adjusting a size of the feeding unit 1640, thereby adjusting the mutual inductance M and the input impedance $Z_{in}$. Since the input impedance $Z_{in}$ may be adjusted by the size of the feeding unit 1640, it may be unnecessary to use a separate matching network to perform impedance matching with an output impedance of a power amplifier.

In a target resonator and a feeding unit included in a wireless power receiving unit, a magnetic field may be distributed as illustrated in FIG. 16A. For example, the target resonator may receive a wireless power from the source resonator using a magnetic coupling. The received wireless power induces a current in the target resonator. The induced current in the target resonator generates a magnetic field, which induces a current in the feeding unit. If the target resonator is connected to the feeding unit as illustrated in FIG. 16A, a direction of a current flowing through the target resonator will be identical to a direction of a current flowing through the feeding unit. Accordingly, for the reasons discussed above in connection with FIG. 16A, a strength of the total magnetic field will increase inside the feeding unit, and will decrease in a region between the feeding unit and the target resonator.

Figure 17:
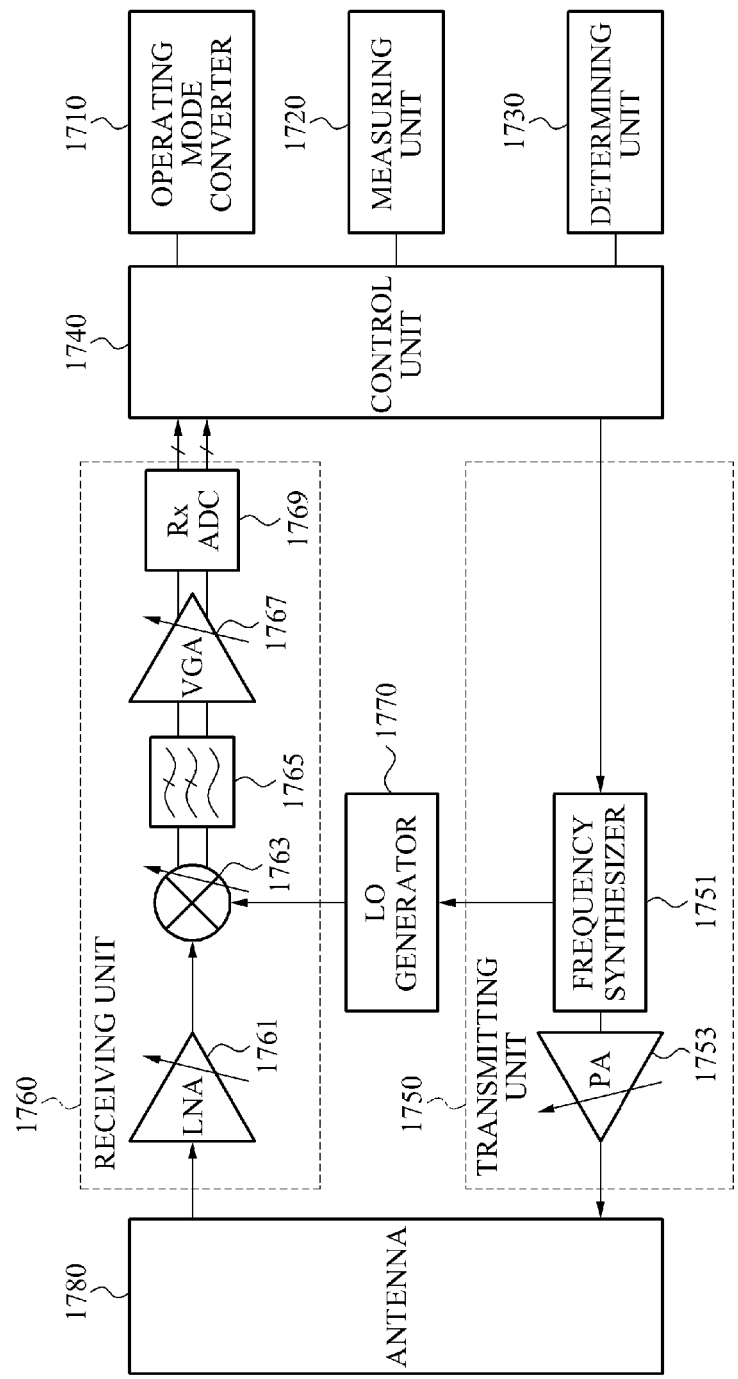
FIG. 17 is a block diagram illustrating a communication apparatus in a wireless power transmission system according to an example.

FIG. 17 is a block diagram illustrating a communication apparatus in a wireless power transmission system according to an example. The communication apparatus illustrated in FIG. 17 may be an apparatus that performs a communication function and a control function in a source device or a target device illustrated in FIGS. 1, 5, and 6.

Referring to FIG. 17, the communication apparatus in the wireless power transmission system includes an operating mode converter 1710, a measuring unit 1720, a determining unit 1730, a control unit 1740, a transmitting unit 1750, and a receiving unit 1760.

The operating mode converter 1710 switches an operating mode between a receiving mode and a transmitting mode. The communication apparatus communicates with a target device in a power cell in which the communication apparatus is able to wirelessly transmit a power through an allocated channel in the transmitting mode. The communication apparatus may continuously transmit a signal indicating that the allocated channel is occupied using a signal having a constant amplitude in the transmitting mode. The communication apparatus receives information from the target device in the power cell in the receiving mode. Also, the communication apparatus may receive a channel allocation request message from neighboring source devices. The communication apparatus may measure state information of a channel based on an interference signal from the neighboring devices, other changes in a peripheral environment, and the like.

The measuring unit 1720 measures a state of the occupied channel while the communication apparatus is operating in the receiving mode. For example, the state of the channel may include a received signal strength indication (RSSI) and a link quality indicator (LQI) of the channel. The RSSI indicates a strength of a wireless signal that is affected by types of communication devices identical to or different from that of a source device, and the LQI indicates a quality of a communication state of the occupied channel.

Although the communication apparatus may perform communication with the target device, the transmitting unit 1750 may transmit a signal indicating that the allocated channel is occupied while the communication apparatus is operating in the transmitting mode. The transmitting unit 1750 may transmit information about the state of the occupied channel. By transmitting a signal having a predetermined amplitude and a constant frequency, in the transmitting mode, the transmitting unit 1750 may report to the neighboring source devices that the allocated channel is occupied. The information about the state of the occupied channel may include information about a source device currently occupying the channel, information about a target device receiving a power from the source device, and information about a schedule of the source device for using the channel. For example, the information about the source device currently occupying the channel may include an ID of the source device, an ID number of the channel occupied by the source device, and the like.

The transmitting unit 1750 includes a frequency synthesizer 1751 and a power amplifier (PA) 1753. The frequency synthesizer 1751 synthesizes a frequency to be used for communication, and outputs a signal having the synthesized frequency. For example, the frequency synthesizer 1751 may synthesize the frequency to be used for communication using an oscillator. The PA 1753 amplifies a power of the signal output from the frequency synthesizer 1751 to reduce an effect of a noise in a wireless frequency band. The amplified signal is transmitted via an antenna 1780. A local oscillator (LO) generator 1770 provides a signal having the synthesized frequency to the receiving unit 1760 based on information about the synthesized frequency provided by the frequency synthesizer 1751. The control unit 1740 may adjust a power of the PA 1753.

The receiving unit 1760 receives a channel allocation request message from the neighboring source devices while the communication apparatus is operating in the receiving mode. The neighboring source devices may include a source device that is added after all available channels in a communication cell have been allocated. The added source device measures state information of each channel in the communication cell, and transmits a channel allocation request message by selecting an optimal channel determined by comparing the measured state information. When selecting a channel, the added source device excludes a channel on which a CW signal is being transmitted. The neighboring source devices may include a source device that can change a channel after being allocated a channel in the communication cell.

The receiving unit 1760 includes a low-noise amplifier (LNA) 1761, a mixer 1763, a low-pass filter (LPF) 1765, a variable gain amplifier (VGA) 1767, and an RX analog-to-digital converter (ADC) 1769. The LNA 1761 amplifies a signal received from the antenna 1780 while introducing very little noise into the amplified signal. The LNA 1761 is located close to the antenna 1780 to reduce transmission line losses. The mixer 1763 generates a signal in a new frequency band by heterodyning the signal amplified by the LNA 1761 with the signal provided by the LO generator 1770, thereby downconverting a wireless frequency band signal to a baseband signal. The LPF 1765 passes low-frequency signals in the new frequency band below a cut-off frequency, cuts off signals in the new frequency band having a frequency higher than the cutoff frequency. The VGA 1767 amplifies the signal passing through the LPF 1765. A gain of the VGA 1767 may be adjusted according to a control voltage. The RX ADC 1769 converts an analog signal output from the VGA 1767 to a digital signal, and outputs the digital signal to the control unit 1740. The control unit 1740 restores a message by interpreting the digital signal. The control unit 1740 may adjust gains of the LNA 1761, the mixer 1763, and the VGA 1767.

The determining unit 1730 determines whether to allocate a channel in response to the channel allocation request message. The determining unit 1730 may determine whether to allocate a channel based on a schedule of the communication apparatus for using the channel, and state information of the occupied channel. If the determining unit 1730 determines to allocate a channel, the transmitting unit 1750 transmits a channel allocation approval message. If the determining unit 1730 determines not to allocate a channel, the transmitting unit 1750 transmits a channel allocation rejection message. Also, the determining unit 1730 determines whether to change the occupied channel based on the state information of the channel measured by the measuring unit 1720. The determining unit 1730 may determine whether to change the channel based on an RSSI of the channel measured by the measuring unit 1720 and/or based on an LQI of the channel measured by the measuring unit 1720.

The control unit 1740 controls a level of the CW signal that is transmitted with a constant amplitude. By transmitting the CW signal on the channel it is using, the communication apparatus in FIG. 17 can report to the neighboring source devices that the channel is being used by the communication apparatus. A distance that the channel occupation information is transmitted is determined by the amplitude of the CW signal. For example, if the amplitude of the CW signal is relatively great, the communication apparatus can transmit the channel occupation information over a farther distance than if the amplitude of the CW signal is relatively small. The control unit 1740 may adjust the amplitude of the CW signal to reduce interference affecting the neighboring source devices based on distances to the neighboring source devices.

The control unit 1740 performs an overall control of the communication apparatus, and controls operations of the operating mode converter 1710, the measuring unit 1720, the determining unit 1730, the transmitting unit 1750, and the receiving unit 1760. In the example in FIG. 17, the operating mode converter 1710, the measuring unit 1720, the determining unit 1730, and the control unit 1740 have been illustrated separately to describe the functions performed by these elements separately. However, during actual implementation of a product, the control unit 1740 may be designed to perform all of the functions of these elements, or only some of the functions of these elements.

Figure 18:
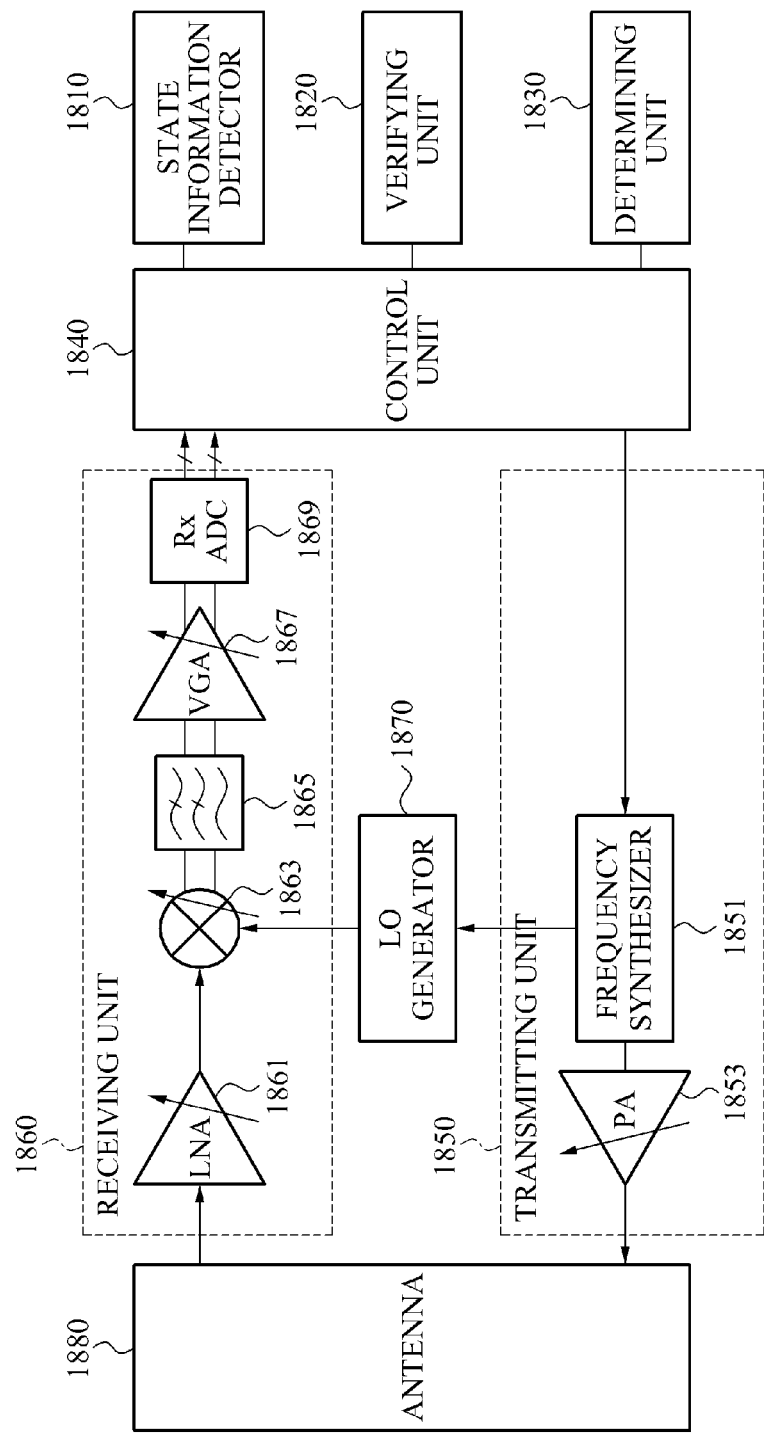
FIG. 18 is a block diagram illustrating a communication apparatus in a wireless power transmission system according to an example.

FIG. 18 is a block diagram illustrating a communication apparatus in a wireless power transmission system according to an example. Referring to FIG. 18, the communication apparatus in the wireless power transmission system includes a state information detector 1810, a verifying unit 1820, a determining unit 1830, a control unit 1840, a transmitting unit 1850, and a receiving unit 1860.

The state information detector 1810 detects state information of channels allocated to a communication cell. The state information detector 1810 may detect RSSIs and LQIs of the channels.

The verifying unit 1820 verifies whether a source device occupying a channel is operating in a transmitting mode based on the detected state information. The verifying unit 1820 verifies which source devices among a plurality of source devices to which channels are allocated are operating in the transmitting mode. If a detected RSSI of the channel is greater than a predetermined level, the verifying unit 1820 verifies that the channel is occupied by a source device operating in the transmitting mode. Alternatively, if a detected LQI of the channel is less than a predetermined level, the verifying unit 1820 verifies that the channel is occupied by a source device operating in the transmitting mode. Also, the verifying unit 1820 may verify whether the channel is occupied by a source device operating in the transmitting mode based on both the RSSI and the LQI. The verifying unit 1820 may verify that the channel is occupied by a source device if a CW signal is detected in the channel. If a new source device that has entered the communication cell is a different type of source device than existing source devices in the communication cell, information about the occupied channel may be obtained through the CW signal.

The determining unit 1830 determines a channel to be allocated based on the detected state information. The determining unit 1830 may determine the channel to be allocated based on an RSSI and/or an LQI of the channel. For example, the determining unit 1830 may determine, as the channel to be allocated, a channel that is not occupied by another source device operating in the transmitting mode among channels having a low RSSI and a high LQI. That is, channels that are not occupied by other source devices operating in the transmitting mode may be verified by the verifying unit 1820. In the foregoing determining process, channels that are occupied by other source devices operating in the transmitting mode may be excluded from a channel allocation request, that is, the channel allocation request may not be transmitted on the channels occupied by other source devices operating in the transmitting mode, and thus interference in the channels occupied by other source devices operating in the transmitting mode resulting from the channel allocation request may be reduced.

The transmitting unit 1850 transmits a channel allocation request message to the source device to which the channel determined by the determining unit is already allocated to obtain permission to use the determined channel. In particular, the transmitting unit 1850 transmits the channel allocation request message to a source device that is operating in a receiving mode through the determined channel. Also, identical timings of the transmitting mode and the receiving mode may be set between identical types of source devices located in the communication cell. Accordingly, the transmitting unit 1850 may transmit the channel allocation request message in a time period in which the source device to which the determined channel is already allocated is operating in the receiving mode. That is, after the channel to be allocated has been determined, the transmitting unit 1850 may delay transmitting the channel allocation request message until the time period in which the source device occupying the determined channel is operating in the receiving mode, and may then transmit the channel allocation request message.

The transmitting unit 1850 includes a frequency synthesizer 1851 and a PA 1853. The frequency synthesizer 1851 synthesizes a frequency to be used for communication, and outputs a signal having the synthesized frequency. For example, the frequency synthesizer 1851 may synthesize the frequency to be used for communication using an oscillator. The PA 1853 amplifies a power of the signal output from the frequency synthesizer 1851 to reduce an effect of a noise in a wireless frequency band. The amplified signal is transmitted via an antenna 1880. An LO generator 1870 provides a signal having the synthesized frequency to the receiving unit 1860 based on information about the synthesized frequency provided by the frequency synthesizer 1851. The control unit 1840 may adjust a power of the PA 1853.

The receiving unit 1860 receives a channel allocation approval message or a channel allocation rejection message from a neighboring source device via the antenna 1880. In response to the channel allocation request message, a source device to which the channel is already allocated determines whether to approve or reject the channel allocation request based on a state of the channel and a state of the source device. Depending on whether the source device decides to approve or reject the channel allocation request, the source device transmits either the channel allocation approval message or the channel allocation rejection message.

If the receiving unit 1860 receives the channel allocation rejection message, the communication apparatus detects state information of other channels, and transmits the channel allocation request message to source devices that are not operating in the transmitting mode. Also, the communication apparatus may delay transmitting the channel allocation request message until a source device occupying a channel having a best channel state is operating in the receiving mode, and may then transmit the channel allocation request message.

The receiving unit 1860 includes an LNA 1861, a mixer 1863, an LPF 1865, a VGA 1867, and an RX ADC 1869. The LNA 1861 amplifies a signal received from the antenna 1880 while introducing very little noise into the amplified signal. The LNA 1861 is located close to the antenna 1880 to reduce transmission line losses. The mixer 1863 generates a signal in a new frequency band by heterodyning the signal amplified by the LNA 1861 with the signal provided by the LO generator 1870, thereby downconverting a wireless frequency band signal to a baseband signal. The LPF 1865 passes low-frequency signals in the new frequency band below a cut-off frequency, and cuts off signals in the new frequency band having a frequency higher than the cutoff frequency. The VGA 1867 amplifies the signal passing through the LPF 1865. A gain of the VGA 1867 may adjusted according to a control voltage. The RX ADC 1869 converts an analog signal output from the VGA 1867 to a digital signal, and outputs the digital signal to the control unit 1840. The control unit 1840 restores a message by interpreting the digital signal. The control unit 1840 may adjust gains of the LNA 1861, the mixer 1863, and the VGA 1867.

The control unit 1840 performs an overall control of the communication apparatus, and controls operations of the state information detector 1810, the verifying unit 1820, the determining unit 1830, the transmitting unit 1850, and the receiving unit 1860. In the example in FIG. 18, the state information detector 1810, the verifying unit 1820, the determining unit 1830, and the control unit 1840 have been illustrated separately to describe the functions performed by these elements separately. However, during actual implementation of a product, the control unit 1840 may be designed to perform all of the functions of these elements, or only some of the functions of these elements.

According to an aspect, a communication may be performed between a source device and a target device without causing interference to other electronic devices, or being affected by the other electronic devices.

According to an aspect, a wireless power transmission and charging system may be operated efficiently since a power cell in which a target device is located may be distinguished in a multi-source environment.

According to an aspect, wasting of power by a source device may be prevented by transmitting a power under a predetermined condition.

According to an aspect, a source device may independently transmit wireless power and data to a target device by allocating a controlling ID to the target device.

Figure 19:
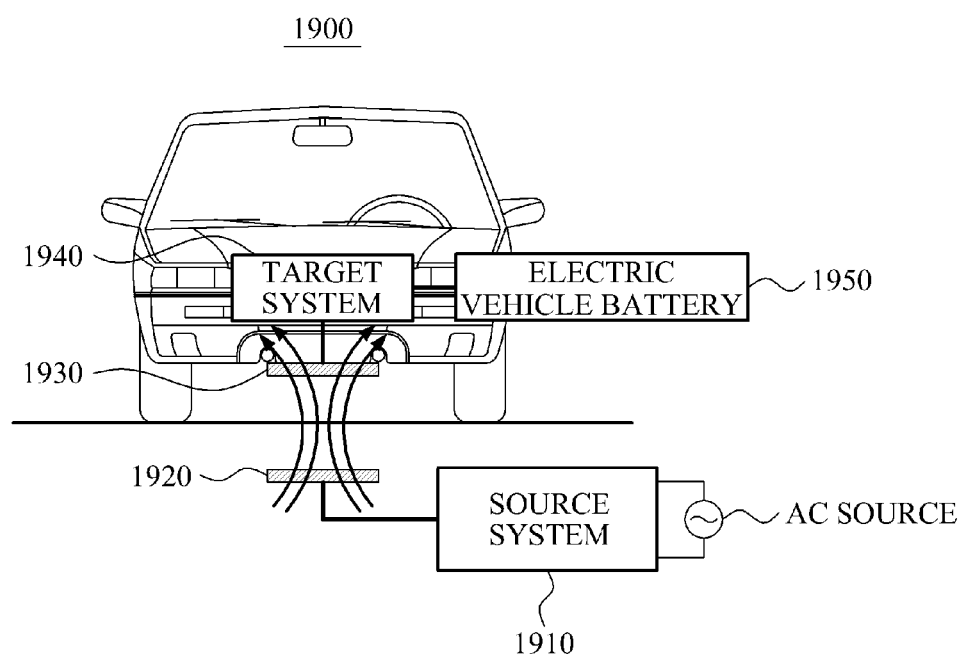
FIG. 19 is a diagram illustrating an example of an electric vehicle charging system.

FIG. 19 illustrates an example of an electric vehicle charging system. An electric vehicle charging system 1900 may include a source system 1910, a source resonator 1920, a target resonator 1930, a target system 1940, and an electric vehicle battery 1950.

The electric vehicle charging system 1900 may have a similar structure to the wireless power transmission system of FIG. 1. The source system 1910 and the source resonator 1920 may function as a source device. Additionally, the target resonator 1930 and the target system 1940 may function as a target device. The source system 1910 may include a variable SMPS, a power amplifier, a matching network, a controller, and a communication unit, similarly to the source device 110 of FIG. 1. The target system 1940 may include a matching network, a rectification unit, a DC/DC converter, a communication unit, and a controller, similarly to the target device 120 of FIG. 1.

The electric vehicle battery 1950 may be charged by the target system 1940. The electric vehicle charging system 1900 may use a resonant frequency in a band of a few kilohertz (KHz) to tens of MHz.

The source system 1910 may generate power, based on a type of a charging vehicle, a capacity of a battery, and a charging state of a battery, and may supply the generated power to the target system 1940. The source system 1910 may control the source resonator 1920 and the target resonator 1930 to be aligned. For example, when the source resonator 1920 and the target resonator 1930 are not aligned, the controller of the source system 1910 may transmit a message to the target system 1940, and may control alignment between the source resonator 1920 and the target resonator 1930.

For example, when the target resonator 1930 is not located in a position enabling maximum magnetic resonance, the source resonator 1920 and the target resonator 1930 may not be aligned. When a vehicle does not stop accurately, the source system 1910 may induce a position of the vehicle to be adjusted, and may control the source resonator 1920 and the target resonator 1930 to be aligned.

The source system 1910 and the target system 1940 may transmit or receive an ID of a vehicle, or may exchange various messages, through communication. The descriptions of FIGS. 2 through 18B may be applied to the electric vehicle charging system 1900. However, the electric vehicle charging system 1900 may use a resonant frequency in a band of a few KHz to tens of MHz, and may transmit power that is equal to or higher than tens of watts to charge the electric vehicle battery 1950.

The control/communication units 115 and 126 in FIG. 1; the communication unit 530 in FIG. 5; the portion of the power converter & communication unit 620 in FIG. 6 that performs in-band communication; the operating mode converter 1710, the measuring unit 1720, the determining unit 1730, and the control unit 1740 in FIG. 17; and the state information detector 1810, the verifying unit 1820, the determining unit 1830, and the control unit 1840 in FIG. 18 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this disclosure has been particularly shown and described with reference to examples thereof, it will be understood by those skilled in the art that various changes in form and details may be made in these examples without departing from the spirit and scope of the invention as defined by the claims and their equivalents. It should be understood that the examples described herein should be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the disclosure, but by the claims and their equivalents, and all variations within the scope of the claims and their equivalents are to be construed as being included in the invention.

What is claimed is:

1. A method of allocating a communication channel and transmitting a power in a wireless power transmission system, the method comprising:
   selecting a controlling communication channel to be used for performing communication with a target device configured to wirelessly receive a power from a source device when the target device is detected;
   transmitting, to the target device, an initial control signal comprising an identifier (ID) of the source device and a channel fix command through the selected controlling communication channel;
   receiving, from the target device, a signal in response to the channel fix command;
   allocating a controlling ID to the target device; and
   entering a charging mode in which a charging power to be used for charging is transmitted from the source device to the target device;
   wherein the channel fix command comprises a command requesting the target device to use the selected controlling communication channel; and
   the charging power is transmitted from the source device to the target device through a magnetic coupling between the source device and the target device.

2. The method of claim 1, wherein the selecting of a controlling communication channel comprises:
   transmitting, to the target device, a wake-up power that is used to activate a communication function and a control function of the target device;
   searching for an available controlling communication channel based on detection of a carrier signal; and
   selecting a controlling communication channel to be used for performing communication with the target device based on a result of the searching for the available controlling communication channel.

3. The method of claim 2, wherein the searching for an available controlling communication channel comprises:
   selecting a first communication channel from N communication channels, N being an integer greater than or equal to 2;
   determining whether a carrier signal is detected through the first communication channel;
   determining whether a level of the detected carrier signal is greater than a predetermined value if a carrier signal is detected through the first communication channel;
   selecting a second communication channel from the N communication channels if the level of the carrier signal detected through the first communication channel is greater than or equal to the predetermined value; and
   determining whether a carrier signal is detected through the second communication channel.

4. The method of claim 3, wherein the selecting of a controlling communication channel further comprises selecting the first communication channel as the controlling communication channel if a carrier signal is not detected through the first communication channel, or if the level of the carrier signal detected through the first communication channel is less than the predetermined value.

5. The method of claim 3, wherein the transmitting of an initial control signal comprises transmitting, to the target device, the initial control signal during consecutive time periods based on an amount of time used by the target device for scanning the N communication channels.

6. The method of claim 1, further comprising:
determining whether a communication error has occurred in the charging mode;
searching for an empty channel among N communication channels if a communication error has occurred, N being an integer greater than or equal to 2;
transmitting, to the target device, a channel change command through the selected controlling communication channel if an empty channel is found; and
changing the controlling communication channel to the found empty channel if a response to the channel change command is received from the target device.

7. The method of claim 1, further comprising:
allocating a controlling ID to a new target device detected in the charging mode;
adjusting a level of the charging power based on a device load of the new target device;
detecting a reflected wave of the charging power; and
releasing a connection of the new target device if a signal level of the reflected wave is greater than a predetermined value.

8. The method of claim 1, further comprising:
receiving, from the target device, information about a receiving sensitivity of the initial control signal and/or information about a receiving level of the charging power; and
determining whether the target device is located within a power transmission area of the source device based on the information about the receiving sensitivity of the initial control signal and/or the information about the receiving level of the charging power.

9. A source device of a wireless power transmission system, the source device comprising:
a power converter configured to generate a wake-up power or a charging power by converting a direct current (DC) voltage to an alternating current (AC) voltage using a resonant frequency;
a source resonator configured to transmit, to a target device, the generated wake-up power or the generated charging power through a magnetic coupling between the source device and the target device; and
a control and communication (control/communication) unit configured to:
search for an available controlling communication channel based on detection of a carrier signal;
select a controlling communication channel to be used for performing communication with the target device based on a result of the searching for the available controlling communication channel; and
transmit, to the target device, an initial control signal comprising an identifier (ID) of the source device and a channel fix command through the selected controlling communication channel.

10. The source device of claim 9, wherein the control/communication unit is further configured to:
select a first communication channel from N communication channels, N being an integer greater than or equal to 2;
determine whether a carrier signal is detected through the first communication channel;
determine whether a level of the detected carrier signal is greater than a predetermined value if a carrier signal is detected through the first communication channel;
select a second communication channel from the N communication channels if the level of the carrier signal detected through the first communication channel is greater than or equal to the predetermined value; and
determine whether a carrier signal is detected through the second communication channel.

11. A method of allocating a communication channel and transmitting a power in a source device of a wireless power transmission system, the method comprising:
detecting a target device configured to wirelessly receive a power from the source device though a magnetic coupling between the source device and the target device;
selecting a controlling communication channel to be used for performing communication with the target device;
transmitting a channel fix command requesting the target device to use the controlling communication channel to communicate with the source device to the target device through the controlling communication channel;
determining whether an acknowledgement has been received from the target device in response to the channel fix command;
if an acknowledgement has been received from the target device in response to the channel fix command, allocating a controlling ID to the target device; and
if a controlling ID has been allocated to the target device, initiating a charging mode of the source device and transmitting a charging power to operate the target device or charge an energy storage element of the target device from the source device to the target device through the magnetic coupling between the source device and the target device.

12. The method of claim 11, further comprising:
if an acknowledgement has not been received from the target device in response to the channel fix command, determining whether a number of times the channel fix command has been transmitted to the target device is greater than a predetermined number of times;
if the number of times the channel fix command has been transmitted to the target device is not greater than the predetermined number of times, transmitting the channel fix command to the target device through the selected controlling communication channel again; and
if the number of times the channel fix command has been transmitted to the target device is greater than the predetermined number of times, performing an error process.

13. The method of claim 11, wherein the selecting of a controlling communication channel comprises:
searching for a communication channel that is not being used by another source device to transmit a power to another target device among a plurality of communication channels;
if a communication channel that is not being used by another source device to transmit a power to another target device is found during the searching, selecting the communication channel that was found as the controlling communication channel; and
if a communication channel that is not being used by another source device to transmit a power to another target device is not found during the searching after all of the communication channels have been searched, repeating the searching.

14. The method of claim 11, further comprising:
determining whether an error in communication between the source device and the target device has occurred while the source device is operating in the charging mode;
if an error in communication has not occurred, repeating the determining of whether an error in communication has occurred;
if an error in communication has occurred, searching for another communication channel that is not being used by another source device to transmit a power to another target device among a plurality of communication channels;
if another communication channel that is not being used by another source device to transmit a power to another target device is found during the searching, changing the controlling communication channel to the other communication channel that is not being used by another source device to transmit a power to another target device;
if another communication channel that is not being used by another source device to transmit a power to another target device is not found during the searching after all of the communication channels have been searched, determining whether a number of times all of the communication channels have been searched is greater than a predetermined number of times;
if the number of times all of the communication channels have been searched is not greater than the predetermined number of times, repeating the searching; and
if the number of times all of the communication channels have been searched is greater than the predetermined number of times, performing an error process.

15. The method of claim 14, wherein the changing of the controlling communication channel to the other communication channel that is not being used by another source device to transmit a power to another target device comprises:

transmitting a channel change command requesting the target device to use the other communication channel to communicate with the source device to the target device through the controlling communication channel;
determining whether an acknowledgement has been received from the target device in response to the channel change command;
if an acknowledgement has been received from the target device in response to the channel change command, changing the controlling communication channel to the other communication channel;
if an acknowledgement has not been received from the target device in response to the channel change command, determined whether a predetermined time has elapsed since the channel change command was transmitted to the target device;
if the predetermined time has not elapsed, repeating the determining of whether an acknowledgement has been received from the target device in response to the channel change command; and
if the predetermined time has elapsed, performing an error process.

16. The method of claim 15, further comprising, after the changing of the controlling communication channel to the other communication channel:
transmitting an inquiry as to whether the target device has changed a communication channel for communicating with the source device to the other communication channel to the target device through the controlling communication channel that has been changed to the other communication channel;
determining whether an acknowledgement has been received from the target device in response to the inquiry;
if an acknowledgement has been received from the target device in response to the inquiry, continuing to operate the source device in the charging mode; and
if an acknowledgement has not been received from the target device in response to the inquiry, performing an error process.

* * * * *